(12) United States Patent
Hayata

(10) Patent No.: US 10,846,538 B2
(45) Date of Patent: Nov. 24, 2020

(54) IMAGE RECOGNITION SYSTEM AND IMAGE RECOGNITION METHOD TO ESTIMATE OCCURRENCE OF AN EVENT

(71) Applicant: Konica Minolta, Inc., Tokyo (JP)

(72) Inventor: Keisuke Hayata, Takatsuki (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 16/346,155

(22) PCT Filed: Aug. 17, 2017

(86) PCT No.: PCT/JP2017/029533
§ 371 (c)(1),
(2) Date: Apr. 30, 2019

(87) PCT Pub. No.: WO2018/105171
PCT Pub. Date: Jun. 14, 2018

(65) Prior Publication Data
US 2020/0057891 A1    Feb. 20, 2020

(30) Foreign Application Priority Data

Dec. 6, 2016  (JP) .................................. 2016-236669

(51) Int. Cl.
*G01R 33/56*  (2006.01)
*G01R 33/563*  (2006.01)
(Continued)

(52) U.S. Cl.
CPC ..... *G06K 9/00771* (2013.01); *G06K 9/00979* (2013.01); *G06K 9/2054* (2013.01);
(Continued)

(58) Field of Classification Search
CPC .......... G06K 9/00771; G06K 9/00335; G06K 9/00342; G06K 9/6262; G06K 9/209;
(Continued)

(56) References Cited

U.S. PATENT DOCUMENTS

2003/0058111 A1   3/2003  Lee et al.
2005/0280711 A1   12/2005  Ishii et al.
(Continued)

FOREIGN PATENT DOCUMENTS

JP   2002-158992 A   5/2002
JP   2007-072964 A   3/2007
(Continued)

OTHER PUBLICATIONS

International Patent Application No. PCT/JP2017/029533; Int'l Written Opinion; dated Nov. 21, 2017; 16 pages.
(Continued)

*Primary Examiner* — Alison Slater
(74) *Attorney, Agent, or Firm* — BakerHostetler

(57) ABSTRACT

An image recognition system includes sensors and a server. Each of the sensors includes a processing unit to perform (i) first image recognition on time-series images chronologically captured, (ii) a first estimation as to whether a predetermined event has occurred by a target of the images, and (iii) generation of transmission data based on the first estimation that the predetermined event occurred. The transmission data may include a feature map of a multilayered neural network or image portions, which include the imaged target respectively clipped from the time-series images. The server may obtain the transmission data and perform second image recognition with greater accuracy than that of the sensors, to perform a second estimation as to whether the predetermined event has occurred.

21 Claims, 15 Drawing Sheets

(51) Int. Cl.
*G06K 9/00* (2006.01)
*G06K 9/20* (2006.01)
*G06K 9/62* (2006.01)
*G06K 9/78* (2006.01)
*G08B 21/04* (2006.01)
*H04N 5/247* (2006.01)

(52) U.S. Cl.
CPC .............. *G06K 9/629* (2013.01); *G06K 9/78* (2013.01); *G08B 21/043* (2013.01); *H04N 5/247* (2013.01)

(58) Field of Classification Search
CPC ... A61B 2503/04; A61B 5/103; A61B 5/1114; A61B 5/1117; A61B 5/1128; G06F 19/3418; G06T 2207/30196; G06T 7/292; G06T 7/20; G08B 13/19608; G08B 21/04; H04N 5/23206; H04N 7/181; H04N 7/183; H04N 5/232
See application file for complete search history.

(56) References Cited

U.S. PATENT DOCUMENTS

| | | | |
|---|---|---|---|
| 2007/0085690 A1 | 4/2007 | Tran | |
| 2014/0301599 A1* | 10/2014 | Shin | G06K 9/00288 382/103 |
| 2015/0288877 A1 | 10/2015 | Glazer | |
| 2017/0154273 A1* | 6/2017 | Guttmann | H04W 4/60 |
| 2017/0177969 A1* | 6/2017 | Zaremski | G06K 9/00771 |
| 2017/0300742 A1* | 10/2017 | Wei | G06K 9/00288 |
| 2018/0259608 A1* | 9/2018 | Golden | G01R 33/5608 |
| 2018/0374570 A1* | 12/2018 | Nishikado | G16H 20/00 |
| 2019/0019053 A1* | 1/2019 | Zhao | G06K 9/00771 |

FOREIGN PATENT DOCUMENTS

| | | |
|---|---|---|
| JP | 2008-021034 A | 1/2008 |
| JP | 2013-009050 A | 1/2013 |
| JP | 2015-070401 A | 4/2015 |
| JP | 2016-097088 A | 5/2016 |
| JP | 2016-115248 A | 6/2016 |
| JP | 2016-157170 A | 9/2016 |
| WO | WO 2016/181731 A1 | 11/2016 |

OTHER PUBLICATIONS

European Patent Application No. 17877984.9; Extended Search Report; dated Nov. 5, 2019; 9 pages.

* cited by examiner

__(1)__

IMAGE RECOGNITION SYSTEM AND IMAGE RECOGNITION METHOD TO ESTIMATE OCCURRENCE OF AN EVENT

CROSS-REFERENCE TO RELATED APPLICATIONS

Pursuant to 35 U.S.C. § 371, this application is a national-stage application of international application PCT/JP2017/029533, which was filed on Aug. 17, 2017 and claims priority to Japanese application 2016-236669 which was filed Dec. 6, 2016. The entire disclosures of the foregoing applications are hereby incorporated by reference.

TECHNICAL FIELD

The present invention relates to an image recognition technique that can be applied to, for example, a system for monitoring a person.

BACKGROUND ART

Image recognition techniques using artificial intelligence are disclosed in, for example, Patent Literatures 1 to 3. They are image recognition techniques using a neural network. Descriptions will be made with reference to Patent Literature 1 as an example. According to the technique disclosed in Patent Literature 1, an image obtained by capturing an action of an observed person on a bed at predetermined time intervals is converted into a silhouette image or a mosaic image to discriminate whether the observed person is in a wake-up state or in a sleeping state using the image data, and then it is determined whether the observed person leaves the bed using a neural network to automatically notify a nurse or the like specified in advance when leaving of the observed person from the bed is sensed.

Deep learning is known as a type of the artificial intelligence. Image recognition using the deep learning enables highly accurate image recognition. When image recognition is performed using the deep learning, while image recognition accuracy increases, a load on a device that performs image recognition increases.

CITATION LIST

Patent Literature

Patent Literature 1: JP 2007-72964 A
Patent Literature 2: JP 2008-21034 A
Patent Literature 3: JP 2016-157170 A

SUMMARY OF INVENTION

An object of the present invention is to provide an image recognition system and an image recognition method capable of reducing a load on a server device in an image recognition system.

In order to achieve the object described above, an image recognition system reflecting one aspect of the present invention includes a plurality of sensor devices, and a server device connected to each of the plurality of sensor devices via a network. Each of the plurality of sensor devices includes an acquisition unit, a first image recognition unit, a transmission data generation unit, and a first communication unit. The acquisition unit obtains time-series images captured in chronological order. The first image recognition unit performs an image recognition process on the time-series images, and estimates whether a predetermined event has occurred in an imaging target captured in the time-series images. On condition that the first image recognition unit has made the estimation that the predetermined event has occurred in the imaging target, the transmission data generation unit generates, as transmission data to be transmitted to the server device, first time-series images obtained by partial images including the image of the imaging target being cut out from respective images included in the time-series images, or a feature map of each of the partial images included in the first time-series images. The first communication unit transmits the transmission data via the network. The server device includes a second communication unit, and a second image recognition unit. The second communication unit receives the transmission data. The second image recognition unit performs, on the transmission data received by the second communication unit, an image recognition process with image recognition accuracy higher than that of the first image recognition unit, and estimates whether the predetermined event has occurred in the imaging target.

Advantages and features provided by one or a plurality of embodiments of the invention are fully understood from the following detailed descriptions and the accompanying drawings. Those detailed descriptions and the accompanying drawings are provided merely as examples, and are not intended to be definition of limitation of the present invention.

DESCRIPTION OF EMBODIMENTS

Figure 1:
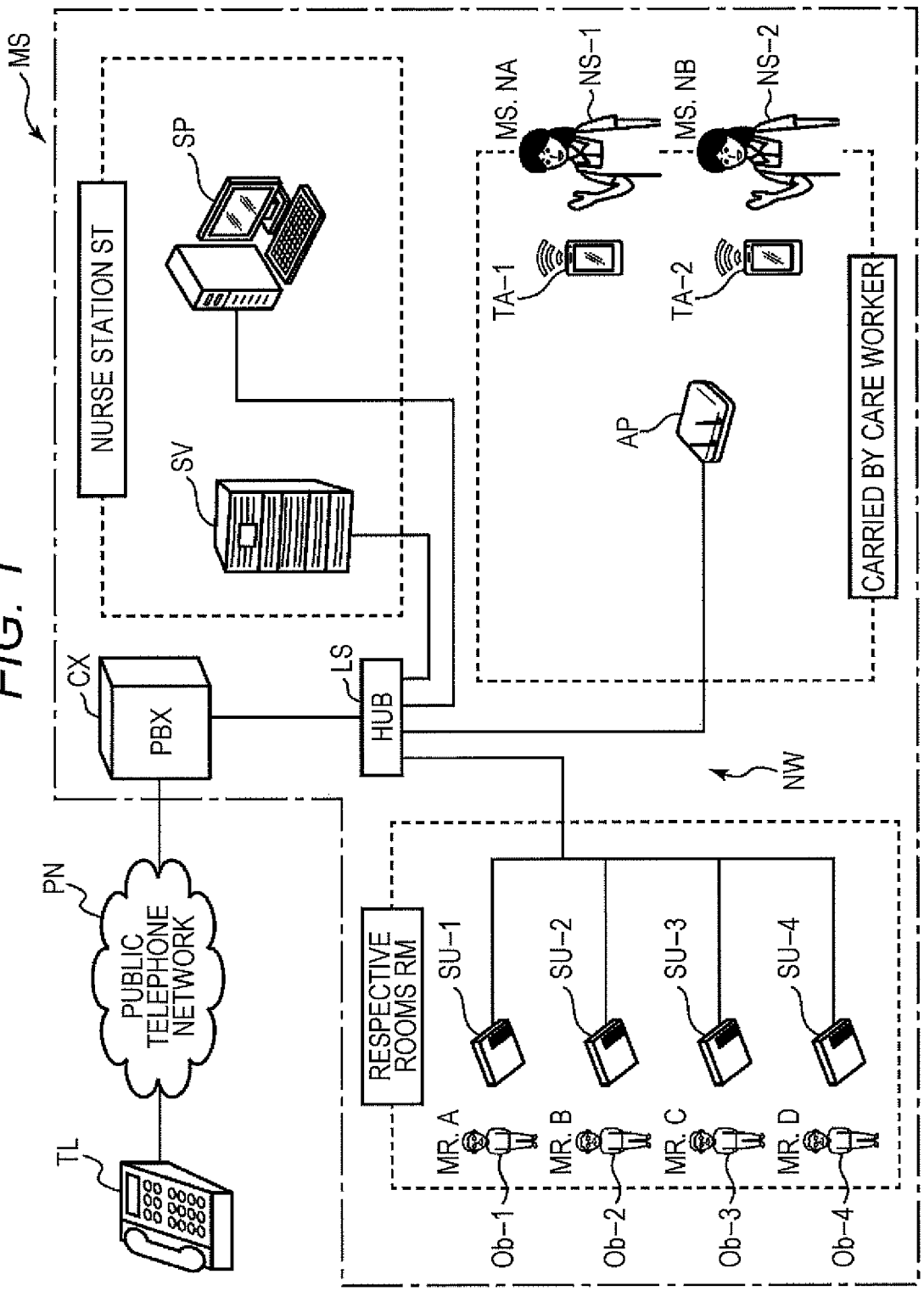
FIG. 1 is an explanatory diagram illustrating a configuration of a monitored person monitoring system according to an embodiment.

There has been known a system including a plurality of sensor devices and a server device connected to respective sensor devices via a network as a system for monitoring a monitored person (e.g., JP 2016-097088 A). The monitored person is, for example, a person who needs nursing or care. This system is introduced in, for example, nursing-care facilities. A sensor device is disposed in each of a plurality of rooms. The sensor device images the monitored person in the room, and sends the captured image of the monitored person to the server device. The server device determines whether a predetermined event (e.g., fall) has occurred on the monitored person using an image recognition technique.

The server device performs an image recognition process on the images sent from each of the plurality of sensor devices (i.e., images of a plurality of monitored persons), and determines whether the predetermined event has occurred for each of the plurality of monitored persons. When image recognition is performed using the deep learning, while image recognition accuracy increases, a load on the server device increases. When image recognition is performed on the images sent from the plurality of sensor devices using the deep learning, the load on the server device significantly increases. Accordingly, a high-performance server device is required for each sensor device to allow the server device to perform image recognition in real time.

In view of the above, the present inventor has created an image recognition system and an image recognition method capable of reducing a load on a server device in an image recognition system including a plurality of sensor devices and a server device connected to each of the plurality of sensor devices via a network.

Hereinafter, one or more embodiments of the present invention will be described with reference to the accompanying drawings. However, the scope of the present invention is not limited to the disclosed embodiments.

In each drawing, a configuration denoted by a same reference sign indicates a same configuration, and description of content of the configuration that has already described is omitted. In the present specification, a generic term is denoted by a reference sign with a suffix being omitted (e.g., sensor device SU), and an individual configuration is denoted by a reference sign with a suffix (e.g., sensor device SU-1).

A monitored person monitoring system according to the embodiment is a system that monitors a monitored person, who is a monitoring target (in other words, watched person who is a watching target), using a plurality of devices. This system includes a terminal device, and a monitored person monitoring device. The monitored person monitoring device is communicably connected to the terminal device, detects a predetermined event related to the monitored person, and notifies the terminal device of the event.

In the present specification, the monitored person monitoring device includes a sensor device, and a management server device communicably connected to each of the sensor device and the terminal device. The monitored person monitoring device may be in a mode in which the sensor device and the management server device are physically separated from each other so that they can be installed in different locations, or may be in a mode in which the sensor device and the management server device are not physically separated so that they cannot be installed in different locations. In the present specification, the former mode will be described.

The sensor device described above detects the predetermined event related to the monitored person, and notifies (informs or transmits) the management server device of the predetermined event. Upon reception of the notification from the sensor device, the management server device manages the event subject to the notification, and re-notifies (re-informs or re-transmits) the terminal device corresponding to the sensor device of the event.

There are two types of devices as the terminal device. One of them is a fixed terminal device, and the other one is a mobile terminal device. The fixed terminal device and the mobile terminal device are different from each other in that, while the fixed terminal device is fixedly operated, the mobile terminal device is carried and operated by a monitor (user). The monitor is, for example, a nurse or a care worker. Since the fixed terminal device and the mobile terminal device are substantially similar, the mobile terminal device will be mainly described hereafter. Note that the terminal device may be one type of the device.

FIG. 1 is an explanatory diagram illustrating a configuration of a monitored person monitoring system MS according to the embodiment. For example, the monitored person monitoring system MS includes a plurality of sensor devices SU (SU-1 to SU-4), a management server device SV, a fixed terminal device SP, one or a plurality of mobile terminal devices TA (TA-1 and TA-2), and a private branch exchange CX, which are communicably connected via a network (communication line) NW. In the example illustrated in FIG. 1, a local area network (LAN) is the network NW. This LAN includes a line concentrator (hub) LS of an L2 switch, and an access point AP, and is a LAN that is wired and wireless in a mixed manner. More specifically, the plurality of sensor devices SU-1 to SU-4, the management server device SV, the fixed terminal device SP, and the private branch exchange CX are connected to the line concentrator LS, and the plurality of mobile terminal devices TA-1 and TA-2 is connected to the line concentrator LS via the access point AP. The network NW forms what is called an intranet using a group of internet protocols such as a transmission control protocol (TCP) and an Internet protocol (IP). The private branch exchange CX is connected to a telephone TL by a public telephone network PN.

The monitored person monitoring system MS is suitably disposed in a building such as a hospital, a welfare facility for the elderly, and a dwelling unit according to a type of a monitored person Ob. In the example illustrated in FIG. 1, the monitored person monitoring system MS is disposed in a building of a nursing-care facility including a plurality of habitable rooms RM occupied by a plurality of monitored persons Ob and a plurality of rooms such as a nurse station.

The sensor device SU has a communication function and the like for communicating with other devices SV, SP, and TA via the network NW, which is a device that detects the predetermined event related to the monitored person Ob, notifies the management server device SV of the detected predetermined event, performs voice communication with the terminal devices SP and TA, and generates an image including a moving image to deliver the moving image to the terminal devices SP and TA. The predetermined event preferably includes an event to be dealt with.

In FIG. 1, four sensor devices SU-1 to SU-4 are illustrated as an example. The sensor device SU-1 is disposed in a habitable room RM-1 (not illustrated) of Mr. A Ob-1 who is one of the monitored persons Ob, the sensor device SU-2 is disposed in a habitable room RM-2 (not illustrated) of Mr. B Ob-2 who is one of the monitored persons Ob, the sensor device SU-3 is disposed in a habitable room RM-3 (not illustrated) of Mr. C Ob-3 who is one of the monitored persons Ob, and the sensor device SU-4 is disposed in a habitable room RM-4 (not illustrated) of Mr. D Ob-4 who is one of the monitored persons Ob.

The management server device SV has a communication function and the like for communicating with other devices SU, SP, and TA via the network NW. Upon reception of a communication signal (hereinafter referred to as a first event notification communication signal) for making notification of the predetermined event from the sensor device SU, the management server device SV stores (records) monitoring information associated with the monitoring of the monitored person Ob on the basis of each piece of information included in the first event notification communication signal, generates a communication signal (hereinafter referred to as a second event notification communication signal) including the monitoring information, and transmits the second event notification communication signal to the terminal devices SP and TA that are associated with the sensor device SU in advance. Accordingly, the management server device SV stores a correspondence relationship between the ID of the sensor device SU, which is the source of the first event notification communication signal, and the ID of the terminal, which is a destination of the second event notification communication signal, and a communication address thereof. The ID of the terminal is an identifier for identifying the terminal devices SP and TA. The management server device SV then provides data corresponding to a request from a client (in the embodiment, the fixed terminal device SP, the mobile terminal device TA, etc.) to the client. Such a management server device SV can be composed of, for example, a computer having a communication function.

The fixed terminal device SP is a device that functions as a user interface (UI) of the monitored person monitoring system MS. In order to achieve this function, the fixed terminal device SP has a communication function for communicating with other devices SU, SV, and TA via the network NW, a display function for displaying predetermined information, an input function for inputting a predetermined instruction and data, and the like, and inputs a predetermined instruction and data to be provided to the management server device SV and the mobile terminal device TA, or displays the monitoring information obtained by the sensor device SU. Such a fixed terminal device SP can be composed of, for example, a computer having a communication function.

The mobile terminal device TA is carried by a monitor NS. The mobile terminal device TA has a communication function for communicating with other devices SV, SP, and SU via the network NW, a display function for displaying predetermined information, an input function for inputting a predetermined instruction and data, and a call function for performing voice communication, and is a device that inputs a predetermined instruction and data to be provided to the management server device SV and the sensor device SU, displays monitoring information (including a moving image) obtained by the sensor device SU on the basis of notification from the management server device SV, responds to or calls a nurse call by voice communication with the sensor device SU, and the like.

Figure 2:
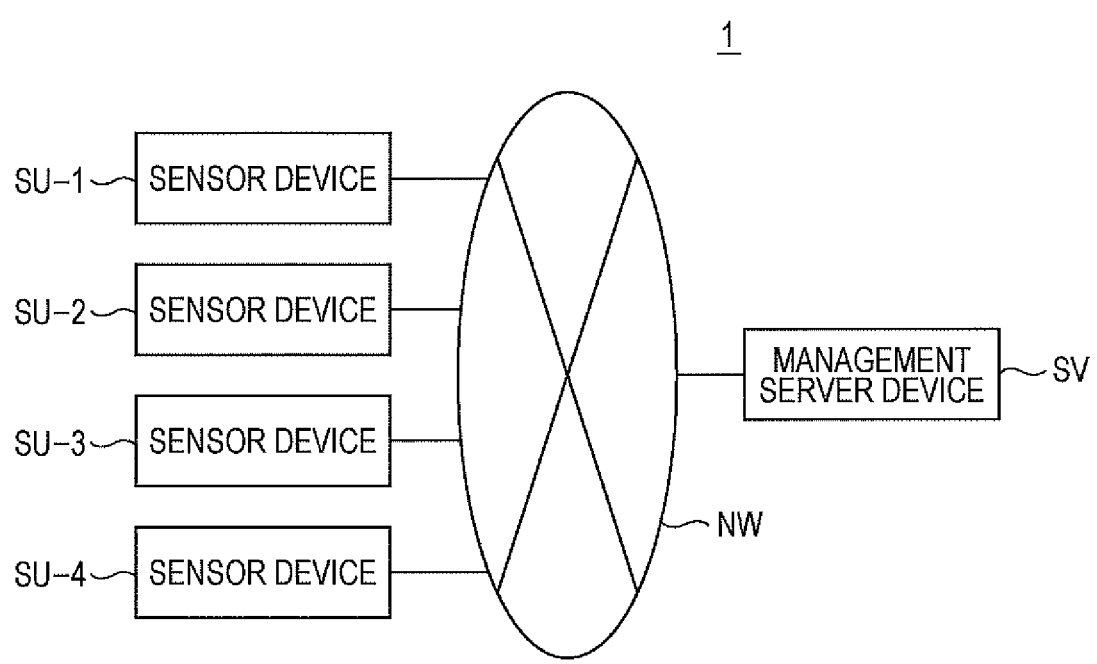
FIG. 2 is an explanatory diagram illustrating a configuration of an image recognition system according to the embodiment.

The image recognition system according to the embodiment is applied to, for example, the monitored person monitoring system MS illustrated in FIG. 1. FIG. 2 is an explanatory diagram illustrating a configuration of an image recognition system 1 according to the embodiment. The image recognition system 1 includes a plurality of sensor devices SU, and a management server device SV (exemplary server device) connected to those sensor devices SU via the network NW. Although FIG. 2 illustrates an exemplary case where the number of the sensor devices SU is four, the number of the sensor devices SU is not limited to four as long as they are plural.

Figure 3:
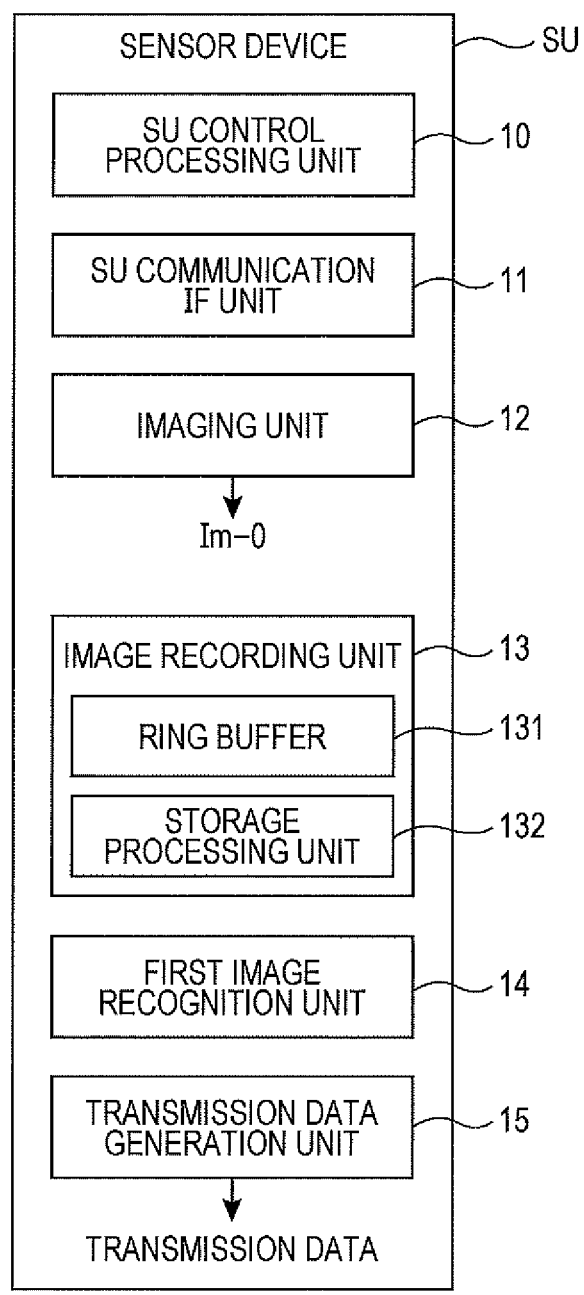
FIG. 3 is a block diagram illustrating a configuration of a sensor device.

FIG. 3 is a block diagram illustrating a configuration of the sensor device SU. The sensor device SU includes a sensor-side control processing unit (SU control processing unit) 10, a sensor-side communication interface unit (SU communication IF unit) 11, an imaging unit 12, an image recording unit 13, a first image recognition unit 14, and a transmission data generation unit 15.

The SU control processing unit 10 controls the entirety of the sensor device SU, and respective units (SU communication IF unit 11, imaging unit 12, image recording unit 13, first image recognition unit 14, and transmission data generation unit 15) of the sensor device SU execute respective functions under the control of the SU control processing unit 10.

The SU control processing unit 10 includes, for example, hardware such as a central processing unit (CPU), a random access memory (RAM), a read-only memory (ROM), and a hard disk drive (HDD), and a program, data, and the like for executing functions of the SU control processing unit 10. A part of or all of respective functions of the SU control processing unit 10 may be implemented by processing performed by a digital signal processor (DSP) instead of or in addition to processing performed by the CPU. Likewise, a part of or all of the functions of the SU control processing unit 10 may be implemented by processing performed by a dedicated hardware circuit instead of or in addition to processing performed by software. The same applies to the image recording unit 13, the first image recognition unit 14, the transmission data generation unit 15, a SV control processing unit 20 (FIG. 5), a second image recognition unit 22 (FIG. 5), an inquiry unit 16 (FIG. 10), a determination unit 23 (FIG. 11), a request unit 24 (FIG. 11), a second time-series images generation unit 17 (FIG. 13), and a third image recognition unit 25 (FIG. 14), which are to be described later.

The SU communication IF unit 11 is a communication interface for communicating with, via the network NW, the management server device SV, the fixed terminal device SP, and the mobile terminal device TA illustrated in FIG. 1 under the control of the SU control processing unit 10.

The imaging unit 12 is a device that captures an imaging target and generates an image of the imaging target. The image includes a still image and a moving image. The imaging unit 12 is, for example, a digital visible light camera or a digital infrared camera.

The imaging unit 12 functions as an acquisition unit. The acquisition unit obtains time-series images Im-0 imaged in chronological order. The time-series images Im-0 are images arranged in the order of captured time, which are, for example, moving images or images captured at a certain time interval. Each image included in the time-series images Im-0 is a high resolution image (e.g., resolution of 1,280 pixels in the horizontal direction×960 pixels in the vertical direction).

The sensor device SU may not include the imaging unit 12. In that mode, the sensor device SU includes an input/output port to which the time-series images Im-0 sent from the imaging unit 12 are input. The input/output port functions as an acquisition unit.

The image recording unit 13 records the time-series images Im-0. The image recording unit 13 includes a ring buffer 131, and a storage processing unit 132.

The ring buffer 131 is capable of storing a predetermined volume of information (data), and has a function of endlessly storing the predetermined volume of information (data) by discarding old information (data) in order when storing new information (data).

The storage processing unit 132 stores the time-series images Im-0 generated by the imaging unit 12 in the ring buffer 131. Accordingly, the ring buffer 131 endlessly stores the time-series images Im-0 composed of an image group from the latest image to the image at a predetermined time before.

The first image recognition unit 14 performs an image recognition process on the time-series images Im-0 generated by the imaging unit 12 in real time, and estimates whether a predetermined event has occurred in the imaging target captured in the time-series images Im-0. The sensor device SU has information processing capability lower than that of the management server device SV. Accordingly, the first image recognition unit 14 cannot execute the image recognition process using the deep learning in real time, for example. The image recognition accuracy of the image recognition process executed by the first image recognition unit 14 in real time is therefore not high.

Occurrence of the predetermined event involves a change in posture of the imaging target. In the case where the imaging target is a person who needs nursing or care (e.g., monitored person Ob illustrated in FIG. 1), the occurrence of the predetermined event on the imaging target indicates, for example, falling, waking up, and getting up. In the case where the imaging target is a person in a shop, the occurrence of the predetermined event on the imaging target indicates, for example, shoplifting. The imaging target is not limited to a human being as long as it is a dynamic body (e.g., animal).

The image recognition process performed by the first image recognition unit 14 will be described with an example of falling of the monitored person Ob (exemplary imaging target). The first image recognition unit 14 generates, for each image included in the time-series images Im-0, an silhouette image of the monitored person Ob captured in each image using a background difference method, for example. A frame difference method may be adopted instead of the background difference method. The first image recognition unit 14 extracts a head area of the monitored person Ob from the silhouette image by, for example, a circular or elliptical Hough transformation, and estimates falling of the monitored person Ob from a position and a size of the head area. When the monitored person Ob falls over, the head area is in a position different from a bed area, and the area of the head area changes from a relatively large value to a relatively small value. The head area of the monitored person Ob may be extracted by pattern matching using a head model prepared in advance instead of the Hough transformation.

Although the first image recognition unit 14 estimates occurrence of the predetermined event on the basis of the area and the position of the silhouette image as described above, the occurrence of the predetermined event may be estimated on the basis of a shape of the silhouette image. This is based on a change in posture of the imaging target (e.g., a change in posture of a person when the person falls over, and a change in posture of a person when the person shoplifts). Falling of the monitored person Ob will be exemplified. The first image recognition unit 14 prepares a model of the monitored person Ob in the standing posture and a model in the falling posture in advance, and applies pattern matching using those models to the silhouette image. When the silhouette image changes from a state matching the model of the monitored person Ob in the standing posture to a state matching the model of the monitored person Ob in the falling posture, the first image recognition unit 14 estimates falling of the monitored person Ob.

Since the information processing capability of the sensor device SU is not high, the estimation executed by the first image recognition unit 14 is relatively low in accuracy. The management server device SV executes more accurate estimation. In order to suppress a case where the first image recognition unit 14 estimates that a predetermined event has not occurred even though the predetermined event has occurred, a threshold value for estimating occurrence of the predetermined event using the first image recognition unit 14 is set low. Accordingly, the first image recognition unit 14 may estimate that the predetermined event has occurred even if the predetermined event has not occurred.

Figure 4:
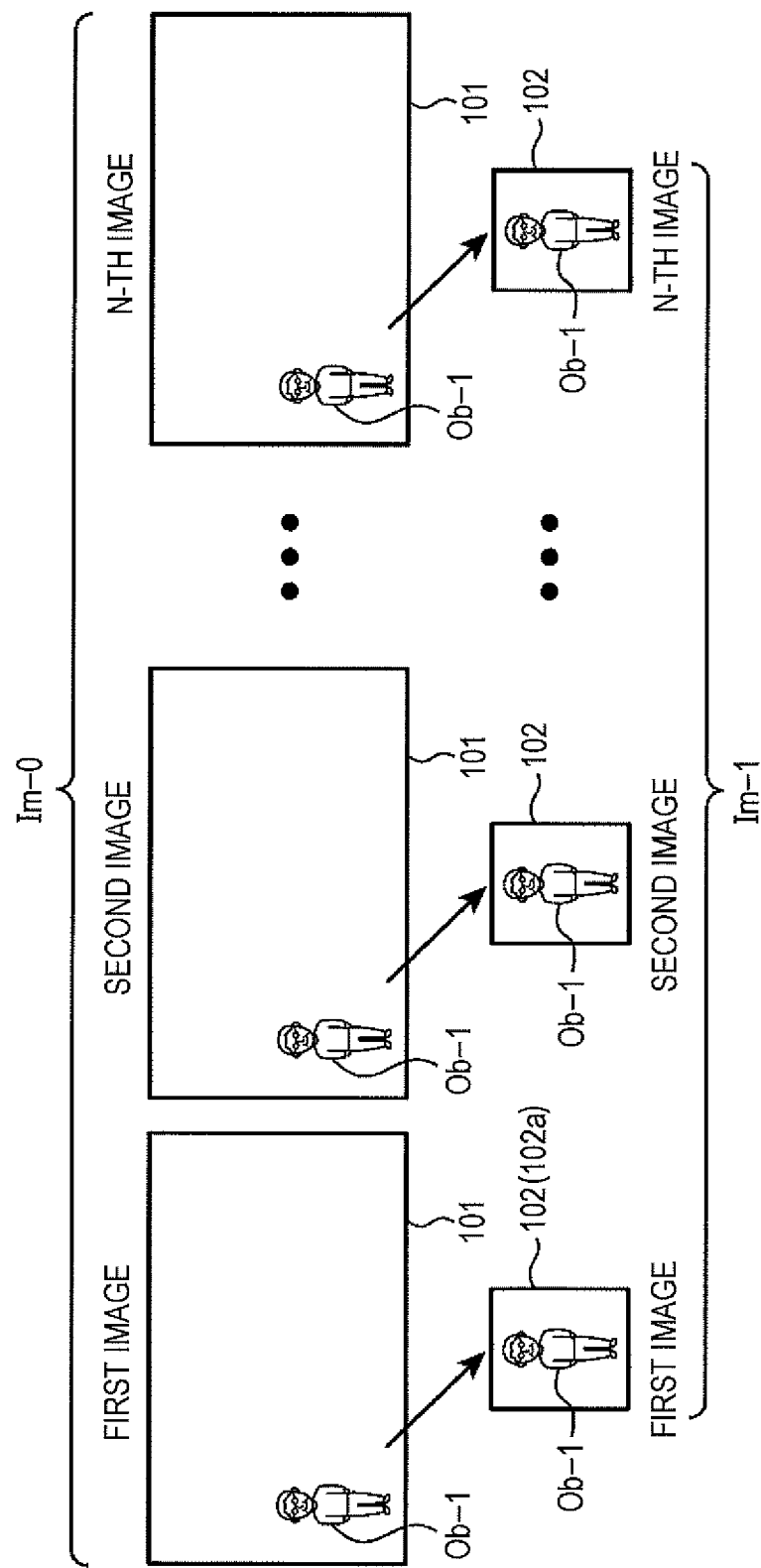
FIG. 4 is an explanatory diagram illustrating first time-series images.

When the first image recognition unit 14 estimates that a predetermined event has occurred in the imaging target (i.e., on condition that the first image recognition unit 14 has made the estimation that the predetermined event has occurred in the imaging target), the transmission data generation unit 15 generates first time-series images Im-1 using the time-series images Im-0. This will be described in detail. FIG. 4 is an explanatory diagram illustrating the first time-series images Im-1. The number of images 101 included in the time-series images Im-0 is assumed to be N. The time-series images Im-0 have a structure in which the first image 101, the second image 101, and the N-th image 101 are arranged in chronological order. As the order increases, the time at which the image 101 is captured departs from the current time (the time at which the first image 101 has been captured is the closest to the current time, and the time at which the N-th image 101 has been captured is the farthest from the current time). When the time-series images Im-0 are moving images, each image 101 included in the time-series images Im-0 is a frame.

The first time-series images Im-1 are images obtained by partial images 102 including the image of the imaging target (e.g., monitored person Ob-1) being cut out from respective images 101 included in the time-series images Im-0. Being cut out means, in other words, being subject to clipping. The number of the partial images 102 included in the first time-series images Im-1 is N. The first time-series images Im-1 have a structure in which the first partial image 102, the second partial image 102, and the N-th partial image 102 are arranged in chronological order. The first time-series images Im-1 is an example of the transmission data to be transmitted to the management server device SV.

With reference to FIG. 3, when the first image recognition unit 14 estimates that a predetermined event has occurred in the imaging target, the transmission data generation unit 15 reads, from the ring buffer 131, the time-series images Im-0 of a predetermined period (e.g., several seconds) including this time, and generates the first time-series images Im-1 using the time-series images Im-0. The SU communication IF unit 11 (exemplary first communication unit) transmits transmission data (in this case, first time-series images Im-1) via the network NW with the management server device SV serving as a destination.

Figure 5:
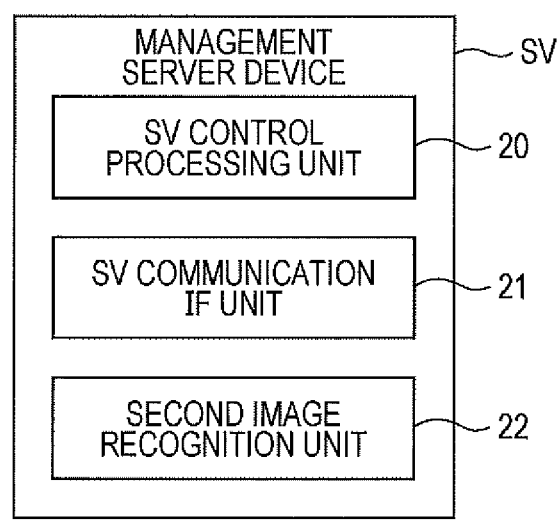
FIG. 5 is a block diagram illustrating a configuration of a management server device.

FIG. 5 is a block diagram illustrating a configuration of the management server device SV. The management server device SV includes a management-server-side control processing unit (SV control processing unit) 20, a management-server-side communication interface unit (SV communication IF unit) 21, and a second image recognition unit 22.

The SV control processing unit 20 controls the entirety of the management server device SV, and respective units (SV communication IF unit 21 and the second image recognition unit 22) of the management server device SV execute respective functions under the control of the SV control processing unit 20.

The SV communication IF unit 21 (exemplary second communication unit) is a communication interface for communicating with, via the network NW, the sensor device SU, the fixed terminal device SP, and the mobile terminal device TA illustrated in FIG. 1 under the control of the SV control processing unit 20. The SV communication IF unit 21 (exemplary second communication unit) receives the transmission data (in this case, first time-series images Im-1) transmitted from the SU communication IF unit 11 illustrated in FIG. 3.

The second image recognition unit 22 performs, on the first time-series images Im-1 (transmission data) received by the SV communication IF unit 21, an image recognition process with image recognition accuracy higher than that of the first image recognition unit 14, and estimates whether a predetermined event has occurred in the imaging target. Since the second image recognition unit 22 performs image processing with the image recognition accuracy higher than that of the first image recognition unit 14, a processing amount thereof is larger than that of the first image recognition unit 14. The image recognition process executed by the second image recognition unit 22 is, for example, an image recognition process using the deep learning.

The image recognition process using the deep learning will be briefly described. It is assumed that the imaging target is the monitored person Ob and occurrence of a predetermined event indicates a fall. The second image recognition unit 22 learns the state in which the monitored person Ob has fallen over using an image of a state in which the monitored person Ob has fallen over and an image of a state in which the monitored person Ob has not fallen over. On the basis of this learning, the second image recognition unit 22 estimates that the monitored person Ob captured in the first time-series images Im-1 has fallen over. This deep learning uses, for example, a convolutional neural network (CNN) or a recurrent neural network (RNN) as a multilayered neural network.

Figure 6:
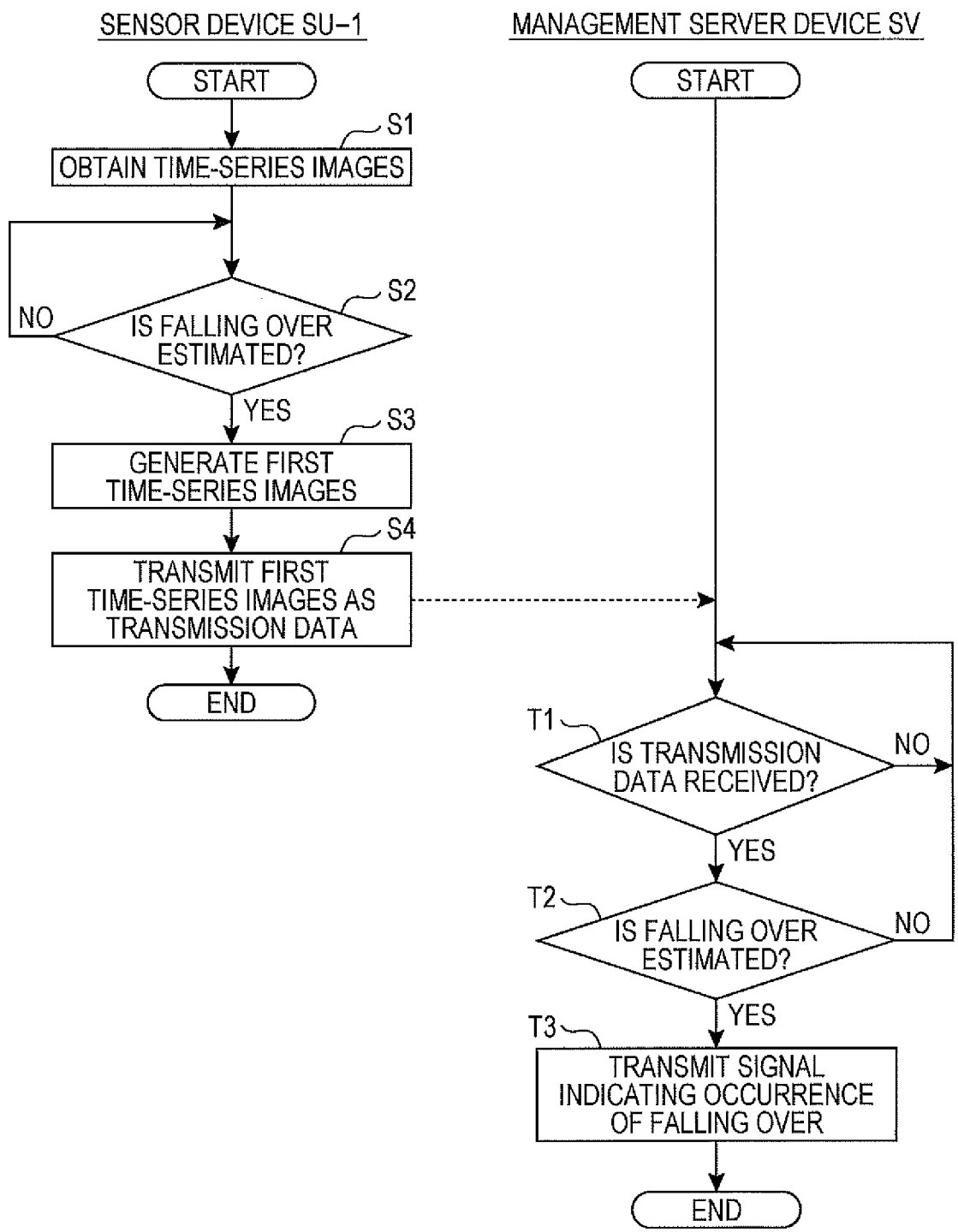
FIG. 6 is a flowchart illustrating operation of the image recognition system according to the embodiment.

Operation of the image recognition system 1 (FIG. 2) according to the embodiment will be described. FIG. 6 is a flowchart illustrating the operation. It is assumed that the imaging target is the monitored person Ob-1 illustrated in FIG. 1 and occurrence of a predetermined event indicates a fall. The imaging unit 12 included in the sensor device SU-1 images the monitored person Ob-1. Accordingly, the SU control processing unit 10, the SU communication IF unit, the imaging unit 12, the image recording unit 13, the first image recognition unit 14, and the transmission data generation unit 15 to be described below are elements included in the sensor device SU-1. The same applies to operation in variations to be described later.

With reference to FIGS. 1, 3, and 6, the imaging unit 12 images the habitable room RM in which the monitored person Ob-1 stays, and generates the time-series images Im-0. In other words, the imaging unit 12 obtains the time-series images Im-0 (step S1). The storage processing unit 132 stores the time-series images Im-0 obtained in step S1 in the ring buffer 131.

The first image recognition unit 14 performs the image recognition process on the time-series images Im-0 obtained in step S1 in real time, and estimates whether the monitored person Ob-1 captured in the time-series images Im-0 has fallen over (step S2).

When the first image recognition unit 14 estimates that the monitored person Ob-1 has not fallen over (No in step S2), the first image recognition unit 14 repeats the processing of step S2.

When the first image recognition unit 14 estimates that the monitored person Ob-1 has fallen over (Yes in step S2), the transmission data generation unit 15 reads, from the ring buffer 131, the time-series images Im-0 of a predetermined period (e.g., several seconds) including this time, and generates the first time-series images Im-1 illustrated in FIG. 4 using the time-series images Im-0 (step S3).

The SU communication IF unit 11 transmits, via the network NW, the first time-series images Im-1 generated in step S3 as transmission data (step S4). The destination of this transmission is the management server device SV.

With reference to FIGS. 1, 5, and 6, the SV control processing unit 20 determines whether the SV communication IF unit 21 has received the transmission data (step T1). When the SV control processing unit 20 determines that the SV communication IF unit 21 has not received the transmission data (No in step T1), the SV control processing unit 20 repeats the processing of step T1.

When the SV communication IF unit 21 has received the transmission data transmitted in step S4, the SV control processing unit 20 determines that the SV communication IF unit 21 has received the transmission data (Yes in step T1). Accordingly, the second image recognition unit 22 performs the image recognition process using the deep learning on the transmission data (first time-series images Im-1) received by the SV communication IF unit 21 in real time, and estimates whether the monitored person Ob-1 has fallen over (step T2). When the multilayered neural network in the deep learning is a CNN, for example, the image recognition process using the deep learning includes generation of a feature map using the first time-series images Im-1, and pooling processing on the feature map.

When the second image recognition unit 22 estimates that the monitored person Ob-1 has not fallen over (No in step T2), the SV control processing unit 20 repeats the processing of step T1.

When the second image recognition unit 22 estimates that the monitored person Ob-1 has fallen over (Yes in step T2), the SV control processing unit 20 causes the SV communication IF unit 21 to transmit a signal indicating that the monitored person Ob-1 has fallen over (a predetermined event has occurred) with the mobile terminal device TA and the fixed terminal device SP serving as destinations (step T3). The mobile terminal device TA and the fixed terminal device SP receive the signal via the network NW, and issue an alarm. The alarm is, for example, warning sound generated by the mobile terminal device TA and the fixed terminal device SP. In this manner, the mobile terminal device TA and the fixed terminal device SP function as alarm units.

Main effects of the image recognition system 1 (FIG. 2) according to the embodiment will be described.

(1) With reference to FIG. 6, when the sensor device SU has made estimation that a predetermined event has occurred in the monitored person Ob (exemplary imaging target) (Yes in step S2), the management server device SV estimates whether the predetermined event has occurred in the monitored person Ob on the basis of the image recognition process using the deep learning (step T2). In this manner, the management server device SV executes the image recognition process using the deep learning as needed without executing it constantly. Therefore, efficiency of the image recognition process using the deep learning can be improved.

(2) In step T2, the first time-series images Im-1 are used to estimate whether the predetermined event has occurred in the monitored person Ob. As illustrated in FIG. 4, since the first time-series images Im-1 include partial images 102 of the image 101 included in the time-series images Im-0, the data volume is relatively small.

According to (1) and (2), the image recognition system 1 according to the embodiment is capable of reducing the load on the management server device SV. Accordingly, one management server device SV can perform the image recognition process using the deep learning in real time with a plurality of sensor devices SU serving as clients.

Figure 7:
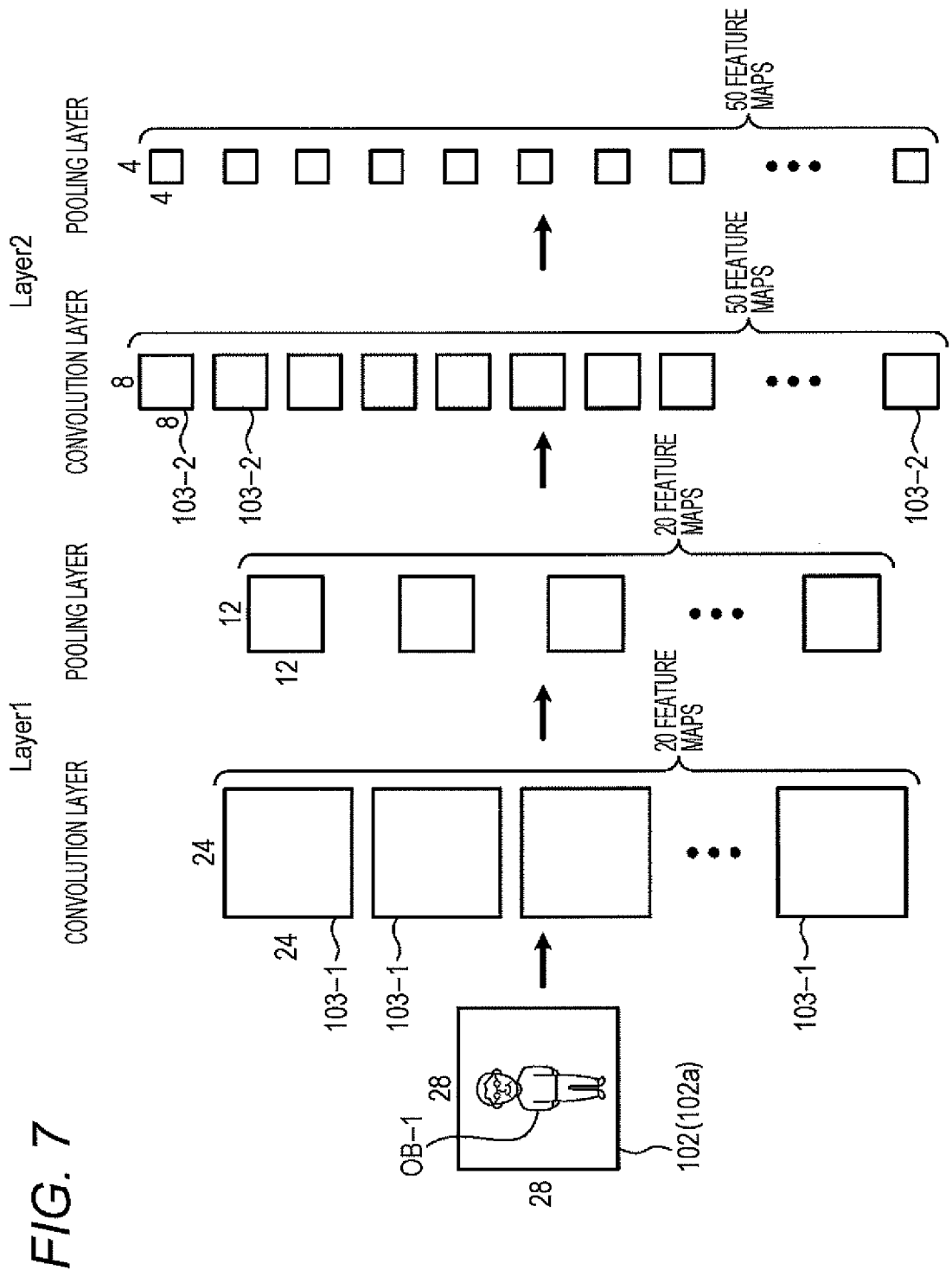
FIG. 7 is an explanatory diagram illustrating a process of generating a feature map.

Variations of the image recognition system 1 according to the embodiment will be described. In a first variation, a feature map is generated as transmission data instead of the time-series images Im-1. That is, in the first variation, the transmission data generation unit 15 illustrated in FIG. 3 generates the first time-series images Im-1, and then generates a feature map for each of a plurality of partial images 102 (FIG. 4) included in the first time-series images Im-1. FIG. 7 is an explanatory diagram illustrating a process of generating the feature map. Generation of the feature map will be described with a partial image 102a illustrated in FIG. 4 serving as an example.

In the first variation, the first image recognition unit 14 illustrated in FIG. 3 includes a CNN. The CNN is a neural network that repeats convolution processing and pooling processing a plurality of times in an intermediate layer, and automatically obtains a feature amount. The intermediate layer includes a plurality of layers. Although two layers (Layer 1 and Layer 2) are illustrated in FIG. 7, three or more layers may be used. Each of the plurality of layers includes a convolution layer and a pooling layer.

The partial image 102a is an input image to be input to the intermediate layer. The number of pixels of the partial image 102a is, for example, 28×28. The convolution layer of Layer 1 performs convolution processing on the partial image 102a, and generates a plurality of feature maps 103-1. The number of the feature maps 103-1 is, for example, 20. The number of pixels of the feature map 103-1 is, for example, 24×24.

The pooling layer of Layer 1 performs pooling processing on each of the plurality of feature maps 103-1. Accordingly, the number of pixels of each feature map 103-1 is, for example, 12×12.

The convolution layer of Layer 2 performs convolution processing on each of the feature maps 103-1 having been subject to the pooling processing, and generates a plurality of feature maps 103-2. The number of the feature maps 103-2 is, for example, 50. The number of pixels of the feature map 103-2 is, for example, 8×8.

The pooling layer of Layer 2 performs pooling processing on each of 50 feature maps 103-2. Accordingly, the number of pixels of each feature map 103-2 is, for example, 4×4.

A plurality of feature maps 103 is generated for one partial image 102. Since the first time-series images Im-1 include a plurality of partial images 102, a plurality of feature maps 103 is generated for each of the plurality of partial images 102.

As described above, the transmission data generation unit 15 generates, as transmission data, the feature map 103 of each partial image 102 included in the first time-series images Im-1. The feature map 103 to be the transmission data may be any of the feature map 103-1 generated in Layer 1, the feature map 103-2 generated in Layer 2, and a feature map (not illustrated) generated in a layer subsequent to Layer 2. The data volume of the transmission data decreases as a layer becomes deeper. For example, when the feature map 103-2 is transmission data, the data volume is smaller than in the case where the feature map 103-1 is transmission data.

Figure 8:
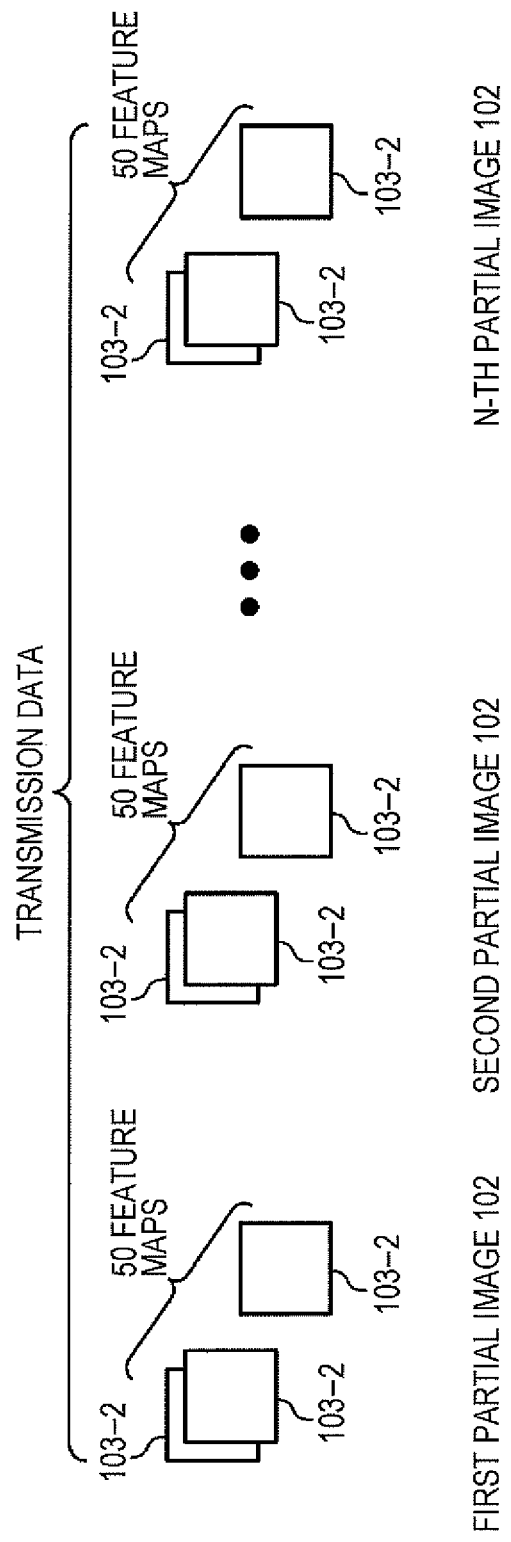
FIG. 8 is an explanatory diagram illustrating transmission data including the feature map.

FIG. 8 is an explanatory diagram illustrating transmission data including the feature map 103. The feature map 103-2 is exemplified as the feature map 103. The transmission data includes 50 feature maps 103-2 related to the first partial image 102 (102a) illustrated in FIG. 4, 50 feature maps 103-2 related to the second partial image 102, and 50 feature maps 103-2 related to the N-th partial image 102.

Figure 9:
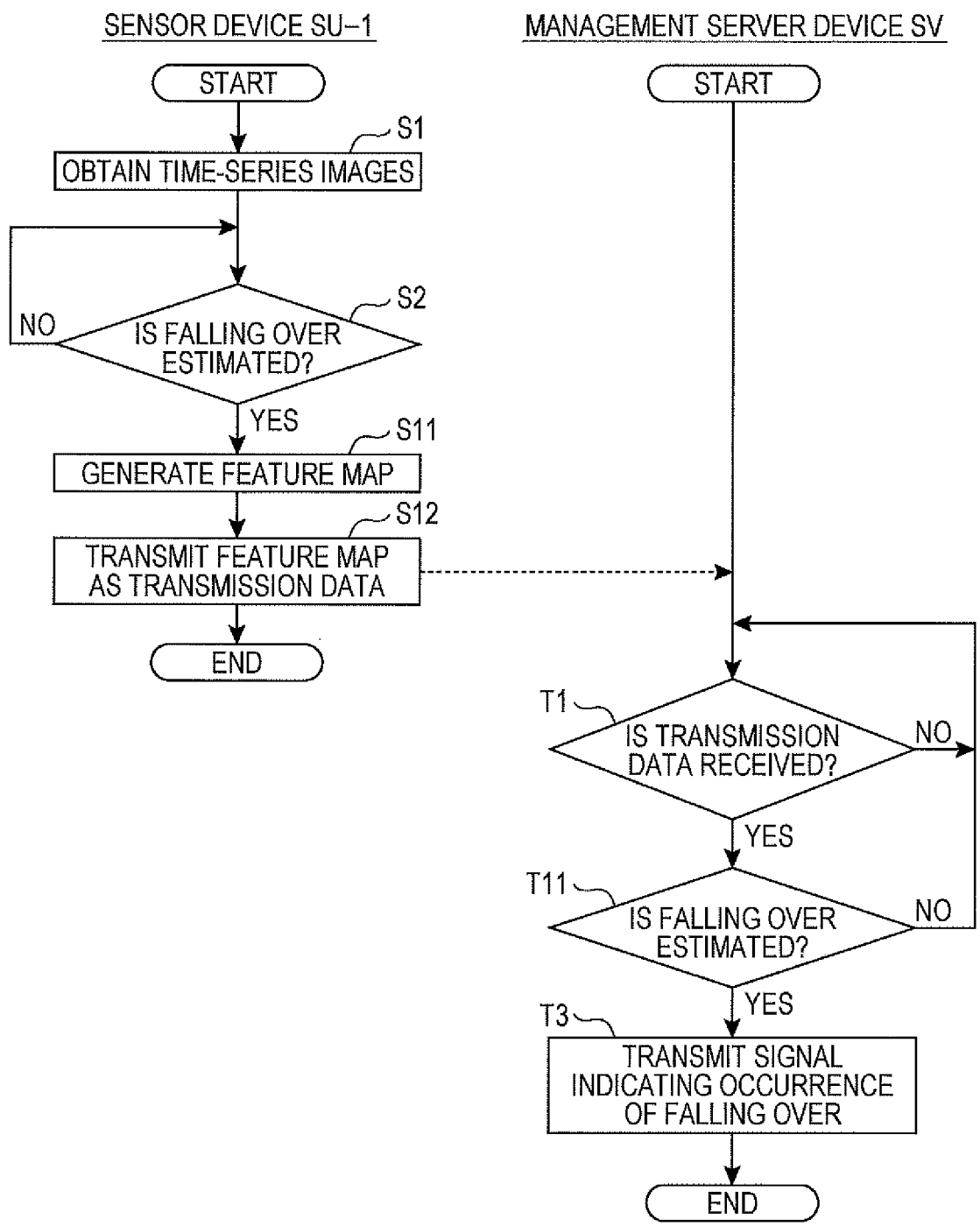
FIG. 9 is a flowchart illustrating operation of a first variation.

Operation in the first variation will be described. FIG. 9 is a flowchart illustrating the operation. Steps S1 and S2 are the same as steps S1 and S2 illustrated in FIG. 6.

With reference to FIGS. 3 and 9, when the first image recognition unit 14 has made estimation that the monitored person Ob-1 has fallen over (Yes in step S2), the transmission data generation unit 15 generates the first time-series images Im-1. This is the same as step S3 illustrated in FIG. 6. The transmission data generation unit 15 generates the feature map 103 of each partial image 102 included in the first time-series images Im-1 (step S11). The generated feature map 103 is the transmission data illustrated in FIG. 8.

The SU communication IF unit 11 transmits, via the network NW, the feature map 103 generated in step S11 as transmission data (step S12). The destination of this transmission is the management server device SV.

Step T1 is the same as step T1 illustrated in FIG. 6.

With reference to FIGS. 5 and 9, when the SV control processing unit 20 determines that the SV communication IF unit 21 has received the transmission data (Yes in step T1), the second image recognition unit 22 performs the image recognition process using the deep learning on the transmission data (feature map 103) received by the SV communication IF unit 21 in real time, and estimates whether the monitored person Ob-1 has fallen over (step T11). This is similar to step T2 illustrated in FIG. 6, but the transmission data includes the feature map 103-2. Accordingly, in step T11, the convolution processing and the pooling processing in Layer 1 illustrated in FIG. 7 can be omitted.

Step T3 is the same as step T3 illustrated in FIG. 6.

Main effects of the first variation will be described. The image recognition process using the deep learning includes generation of the feature map 103. With reference to FIG. 9, the sensor device SU generates transmission data including the feature map 103-2 (step S11), and the management server device SV performs the image recognition process using the deep learning on the transmission data (step T11). In this manner, according to the first variation, the sensor device SU and the management server device SV share the image recognition process using the deep learning. Therefore, the load on the management server device SV can be reduced.

A second variation will be described. As illustrated in FIG. 9, according to the first variation, the sensor device SU and the management server device SV share the image recognition process using the deep learning. This is referred to as a shared process. On the other hand, as illustrated in FIG. 6, in the image recognition system 1 according to the embodiment, the management server device SV independently performs the image recognition process using the deep learning. This is referred to as an independent process.

The performance of the management server device SV is higher than that of the sensor device SU. Accordingly, when the load on the management server device SV is low, the image recognition process using the deep learning can be speeded up in the independent process than in the shared process. On the other hand, when the load on the management server device SV is high, the image recognition process using the deep learning can be speeded up in the shared process than in the independent process. According to the second variation, the independent process is selected when the load on the management server device SV is low, and the shared process is selected when the load on the management server device SV is high.

Figure 10:
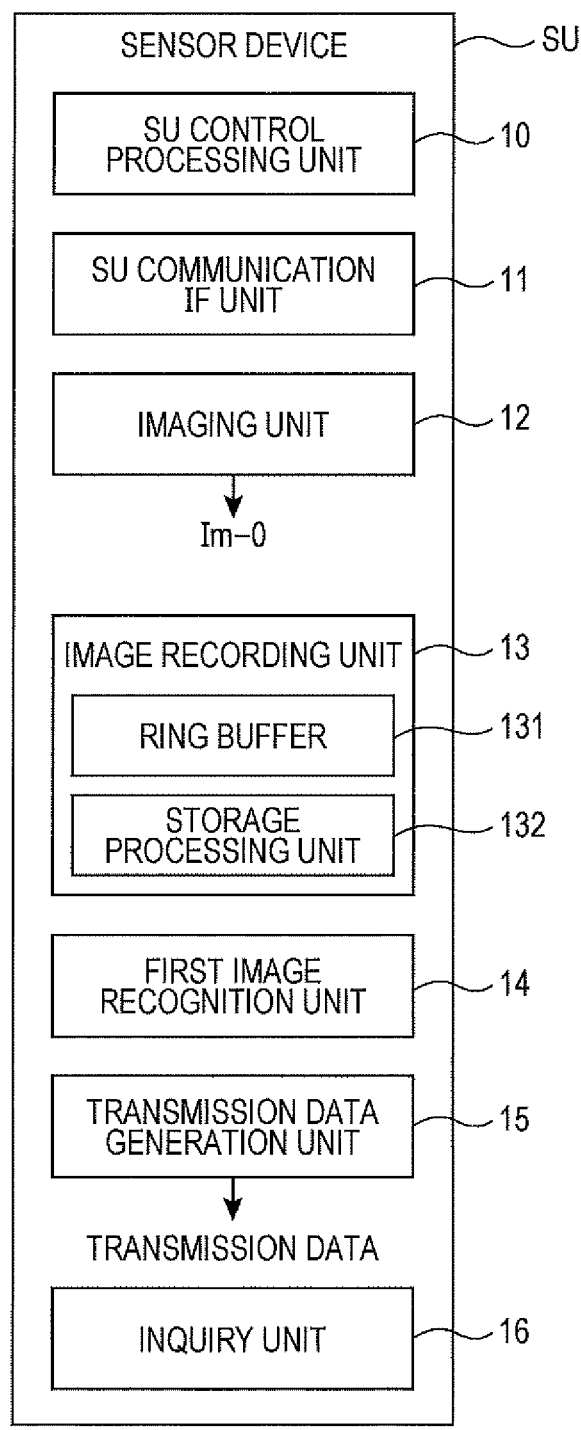
FIG. 10 is a block diagram illustrating a configuration of a sensor device included in a second variation.

FIG. 10 is a block diagram illustrating a configuration of the sensor device SU included in the second variation. This sensor device SU has a configuration in which an inquiry unit 16 is added to the sensor device SU illustrated in FIG. 3. The inquiry unit 16 inquires of the management server device SV about the format of the transmission data. Examples of the format of the transmission data include the first time-series images Im-1, and the feature map 103.

Figure 11:
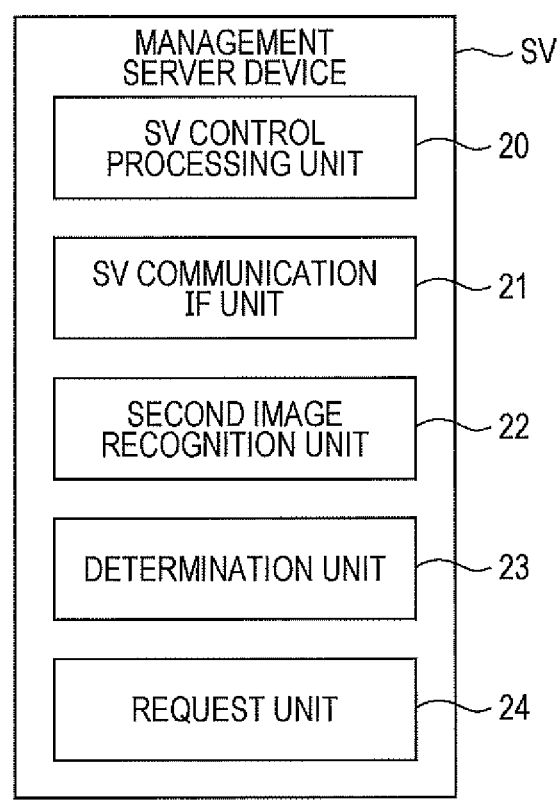
FIG. 11 is a block diagram illustrating a configuration of a management server device included in the second variation.

FIG. 11 is a block diagram illustrating a configuration of the management server device SV included in the second variation. This management server device SV has a configuration in which a determination unit 23 and a request unit 24 are added to the management server device SV illustrated in FIG. 5.

The determination unit 23 determines whether a predetermined condition indicating that the load on the management server device SV is high is satisfied. A first example of the predetermined condition is a usage rate of the CPU included in the management server device SV. The determination unit 23 determines that the predetermined condition is satisfied when the usage rate of the CPU exceeds a predetermined threshold value, and determines that the predetermined condition is unsatisfied when the usage rate of the CPU is equal to or less than the predetermined threshold value.

A second example of the predetermined condition is a free space of the memory (RAM) included in the management server device SV. The determination unit 23 determines that the predetermined condition is unsatisfied when the free space exceeds a predetermined threshold value, and determines that the predetermined condition is satisfied when the free space is equal to or less than the predetermined threshold value.

A third example of the predetermined condition is a line load of the network used by the management server device SV. The determination unit 23 determines that the predetermined condition is satisfied when the line load exceeds a predetermined threshold value, and determines that the predetermined condition is unsatisfied when the line load is equal to or less than the predetermined threshold value.

A fourth example of the predetermined condition is a load on a graphics processing unit (GPU) included in the management server device SV. The determination unit 23 determines that the predetermined condition is satisfied when the load on the GPU exceeds a predetermined threshold value, and determines that the predetermined condition is unsatisfied when the load on the GPU is equal to or less than the predetermined threshold value.

A fifth example of the predetermined condition is the number of sensor devices SU requesting the management server device SV to estimate whether a predetermined event has occurred in the monitored person Ob. When the first image recognition unit 14 included in the sensor device SU has made the estimation that the predetermined event has occurred in the monitored person Ob, the SU communication IF unit 11 included in the sensor device SU transmits the transmission data to the management server device SV (step S4 in FIG. 6, and step S12 in FIG. 9). Accordingly, the sensor device SU requests the management server device SV to estimate whether the predetermined event has occurred in the monitored person Ob (hereinafter referred to as an estimation request). The determination unit 23 determines that the predetermined condition is satisfied when the number of sensor devices SU to which the estimation is requested exceeds a predetermined threshold value, and determines that the predetermined condition is unsatisfied when the number of sensor devices SU to which the estimation is requested is equal to or less than the predetermined threshold value.

When the predetermined condition is unsatisfied (i.e., in a state where the load on the management server device SV is low), the request unit 24 requests the first time-series images Im-1 as transmission data to, from among the plurality of sensor devices SU, the sensor device SU to which the estimation of whether the predetermined event has occurred in the monitored person Ob is requested. This is the independent process mentioned above. On the other hand, when the predetermined condition is satisfied (i.e., in a state where the load on the management server device SV is high), the request unit 24 requests the feature map 103 as transmission data to the sensor device SU to which the estimation is requested. This is the shared process mentioned above.

Figure 12:
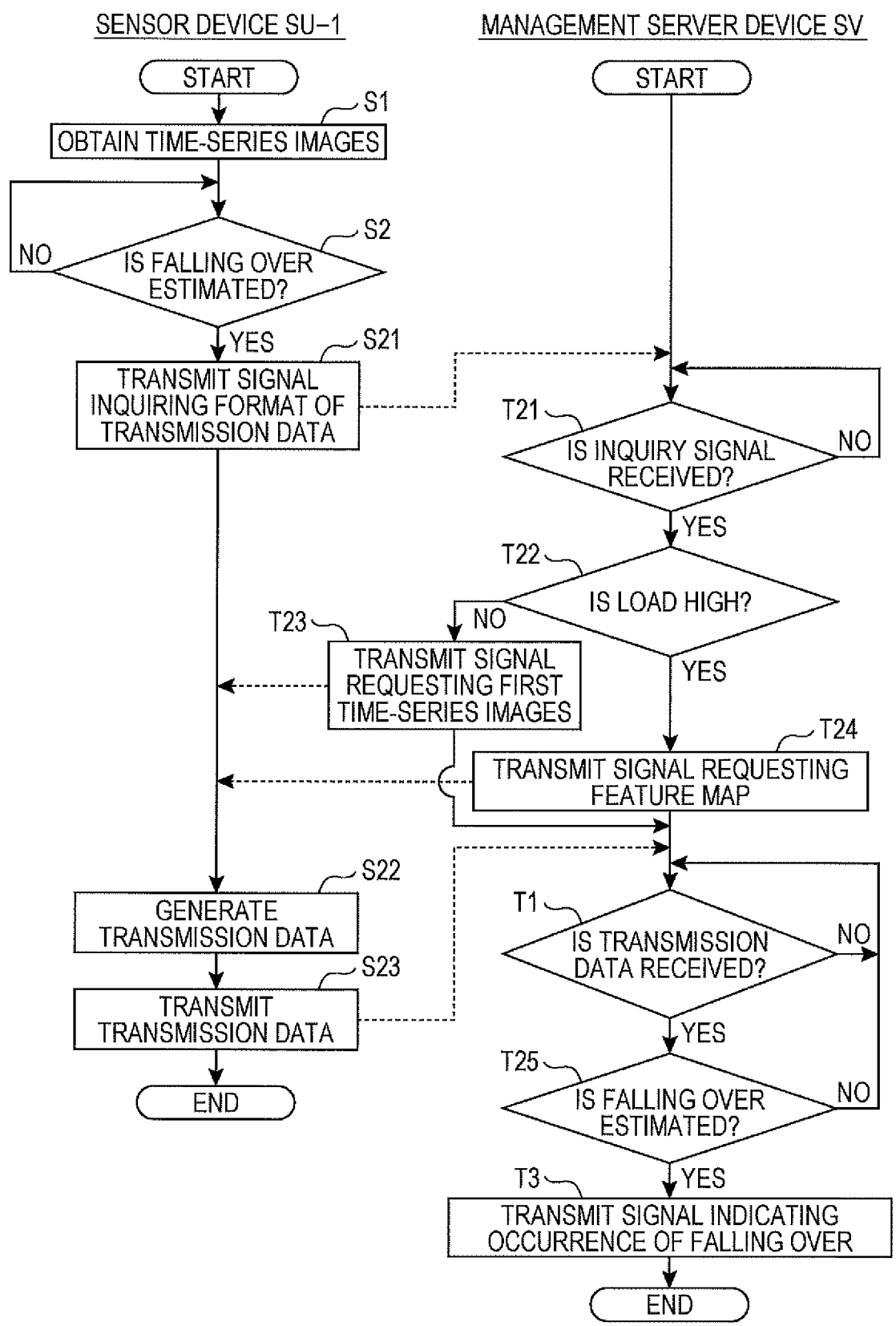
FIG. 12 is a flowchart illustrating operation of the second variation.

Operation in the second variation will be described. FIG. 12 is a flowchart illustrating the operation. Steps S1 and S2 are the same as steps S1 and S2 illustrated in FIG. 6.

With reference to FIGS. 10, 11, and 12, when the first image recognition unit 14 has made the estimation that the monitored person Ob-1 has fallen over (Yes in step S2), the inquiry unit 16 causes the SU communication IF unit 11 to transmit a signal inquiring a format of the transmission data (step S21). The destination of the inquiry signal is the management server device SV.

The SV control processing unit 20 determines whether the SV communication IF unit 21 has received the inquiry signal (step T21). When the SV control processing unit 20 determines that the SV communication IF unit 21 has not received the inquiry signal (No in step T21), the SV control processing unit 20 repeats the processing of step T21.

When the SV communication IF unit 21 has received the inquiry signal transmitted in step S21 (Yes in step T21), the determination unit 23 determines whether the predetermined condition indicating that the load on the management server device SV is high is satisfied (step T22).

It is assumed that the determination unit 23 determines that the predetermined condition indicating that the load on the management server device SV is high is unsatisfied (No in step T22). In other words, the load on the management server device SV is assumed to be low. At this time, the request unit 24 causes the SV communication IF unit 21 to transmit a signal requesting the first time-series images Im-1 as transmission data (step T23). The destination of this request signal is the sensor device SU-1.

It is assumed that the determination unit 23 determines that the predetermined condition indicating that the load on the management server device SV is high is satisfied (Yes in step T22). In other words, the load on the management server device SV is assumed to be high. At this time, the request unit 24 causes the SV communication IF unit 21 to transmit a signal requesting the feature map 103 as transmission data (step T24). The destination of this request signal is the sensor device SU-1.

When the SU communication IF unit 11 has received the signal requesting the first time-series images Im-1 indicated in step T23, the transmission data generation unit 15 generates the first time-series images Im-1 as transmission data (step S22). This is the same as step S3 illustrated in FIG. 6. The SU communication IF unit 11 transmits, via the network NW, the first time-series images Im-1 generated in step S22 as transmission data (step S23). This is the same as step S4 illustrated in FIG. 6.

When the SU communication IF unit 11 has received the signal requesting the feature map 103 indicated in step T24, the transmission data generation unit 15 generates the feature map 103 as transmission data (step S22). This is the same as step S11 illustrated in FIG. 9. The SU communication IF unit 11 transmits, via the network NW, the feature map 103 generated in step S22 as transmission data (step S23). This is the same as step S12 illustrated in FIG. 9.

The SV control processing unit 20 determines whether the SV communication IF unit 21 has received the transmission data (first time-series images Im-1 or feature map 103) (step T1). When the SV control processing unit 20 determines that the SV communication IF unit 21 has not received the transmission data (No in step T1), the SV control processing unit 20 repeats the processing of step T1.

When the SV communication IF unit 21 has received the transmission data transmitted in step S23, the SV control processing unit 20 determines that the SV communication IF unit 21 has received the transmission data (Yes in step T1). Accordingly, the second image recognition unit 22 estimates whether the monitored person Ob-1 has fallen over (step T25). When the transmission data received by the SV communication IF unit 21 is the first time-series images Im-1, step T25 is the same as step T2 illustrated in FIG. 6. That is, the second image recognition unit 22 generates the feature map 103 of each partial image 102 included in the first time-series images Im-1, and estimates whether the predetermined event has occurred in the monitored person Ob-1 using the feature map 103.

On the other hand, when the transmission data received by the SV communication IF unit 21 is the feature map 103, step T25 is the same as step T11 illustrated in FIG. 9. That is, the second image recognition unit 22 estimates whether the predetermined event has occurred in the monitored person Ob-1 using the feature map 103.

After step T25, the management server device SV performs the processing of step T3. This is the same as step T3 illustrated in FIG. 6.

Main effects of the second variation will be described. As described in step T25, the second image recognition unit 22 estimates whether the predetermined event has occurred in the monitored person Ob using the feature map 103 (e.g., transmission data including the feature map 103-2 illustrated in FIG. 8). The feature map 103 is generated using the first time-series images Im-1. Therefore, when the second image recognition unit 22 starts the image recognition process from the feature map 103, the load on the management server device SV can be reduced compared with a case where the image recognition process starts from the first time-series images Im-1.

Accordingly, when the predetermined condition indicating that the load on the management server device SV is high is satisfied (i.e., in a state where the load on the management server device SV is high), the sensor device SU generates the feature map 103 (step S22), thereby reducing the processing amount of the second image recognition unit 22. As a result, even when the load on the management server device SV is high, the second image recognition unit 22 can speed up the estimation as to whether the predetermined event has occurred in the monitored person Ob.

The performance of the management server device SV is higher than that of the sensor device SU. Accordingly, when the predetermined condition indicating that the load on the management server device SV is high is unsatisfied (i.e., in a state where the load on the management server device SV is low), the second image recognition unit 22 also executes the generation process of the feature map 103 (step T25). As a result, the second image recognition unit 22 can speed up the estimation as to whether the predetermined event has occurred in the monitored person Ob.

As described above, according to the second variation, the sensor device SU selects the first time-series images Im-1 or the feature map 103 as transmission data according to the load on the management server device SV (step T22). As a result, the second image recognition unit 22 can speed up the estimation as to whether the predetermined event has occurred in the monitored person Ob.

In the image recognition system 1 (FIG. 2) according to the embodiment and in the first and second variations, the first image recognition unit 14 performs the image recognition process on the time-series images Im-0 (step S2 illustrated in FIGS. 6, 9, and 12). However, the first image recognition unit 14 may perform the image recognition process on the second time-series images in which the resolution of the time-series images Im-0 is lowered. In that mode, the sensor device SU includes a second time-series images generation unit. The second time-series images generation unit generates the second time-series images in which the resolution of the time-series images Im-0 generated by the imaging unit 12 is lowered. The first image recognition unit 14 performs the image recognition process on the second time-series images instead of the time-series images Im-0, and estimates whether a predetermined event has occurred in the monitored person Ob captured in the second time-series images. Since the resolution of the second time-series images is low, the processing amount for the image recognition can be reduced in the first image recognition unit 14. Therefore, according to this mode, image recognition can be executed in real time even if the information processing capability of the sensor device SU is low.

A third variation will be described. Since the second image recognition unit 22 (FIGS. 5 and 11) performs the image recognition process using the deep learning, the processing amount is large, and the load on the management server device SV is high. The processing amount of the image recognition process performed by the second image recognition unit 22 is preferably minimized. According to the third variation, the management server device SV includes a third image recognition unit 25, whereby the processing amount of the image recognition process performed by the second image recognition unit 22 can be reduced.

Figure 13:
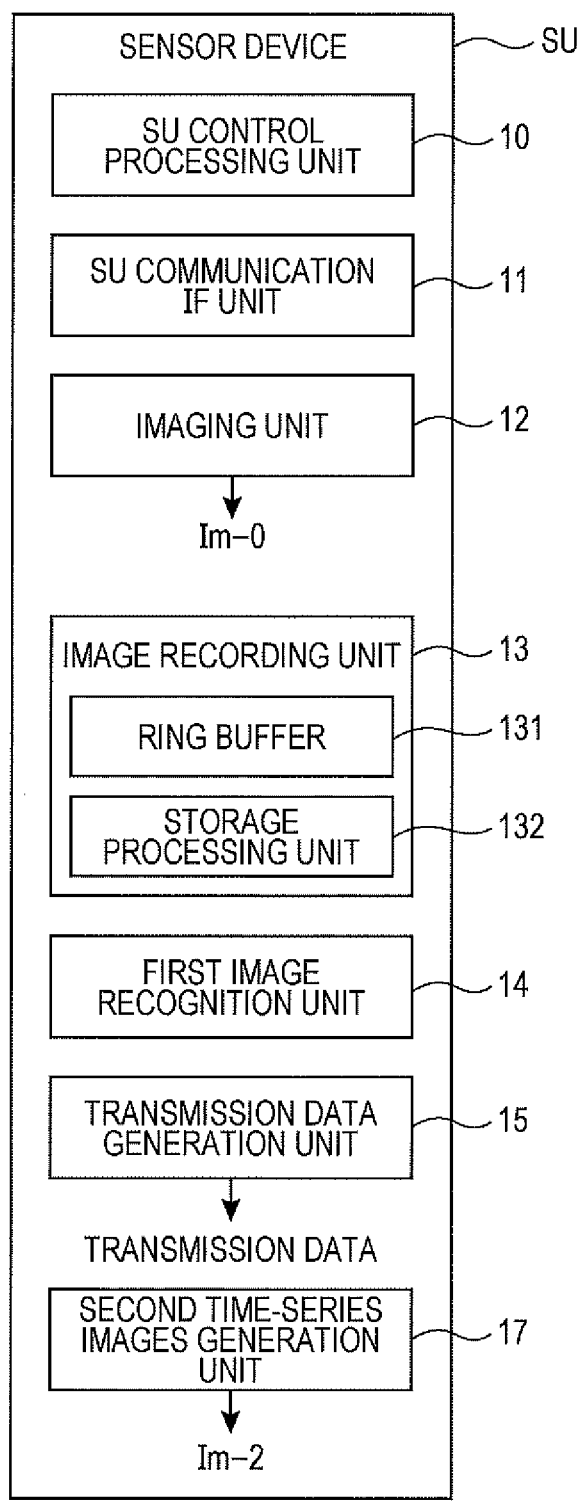
FIG. 13 is a block diagram illustrating a configuration of a sensor device included in a third variation.

FIG. 13 is a block diagram illustrating a configuration of the sensor device SU included in the third variation. This sensor device SU has a configuration in which a second time-series images generation unit 17 is added to the sensor device SU illustrated in FIG. 3. The second time-series images generation unit 17 generates a second time-series images Im-2 in which the resolution of the time-series images Im-0 generated by the imaging unit 12 (exemplary acquisition unit) is lowered. For example, when the resolution of the time-series images Im-0 is 1,280 pixels in the horizontal direction×960 pixels in the vertical direction, the resolution of the second time-series images Im-2 is 320 pixels in the horizontal direction×240 pixels in the vertical direction.

Figure 14:
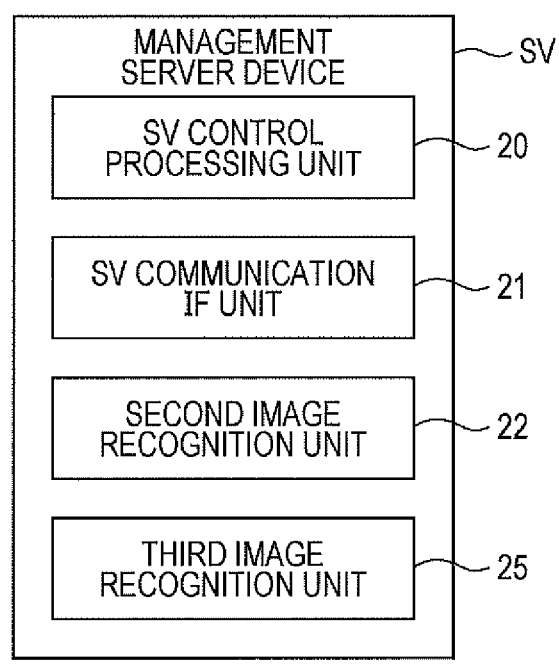
FIG. 14 is a block diagram illustrating a configuration of a management server device included in the third variation.

FIG. 14 is a block diagram illustrating a configuration of the management server device SV included in the third variation. This management server device SV has a configuration in which the third image recognition unit 25 is added to the management server device SV illustrated in FIG. 5. The third image recognition unit 25 performs, on the second time-series images Im-2, an image recognition process with image recognition accuracy higher than that of the first image recognition unit 14, and estimates whether a predetermined event has occurred in the monitored person Ob. The image recognition process executed by the third image recognition unit 25 is an image recognition process using the deep learning. Since the third image recognition unit 25 performs the image recognition process using the deep learning, the image recognition accuracy thereof is higher than that of the first image recognition unit 14. Since the third image recognition unit 25 performs the image recognition process on the second time-series images Im-2 with low resolution, the image recognition accuracy thereof is lower than that of the second image recognition unit 22.

Figure 15:
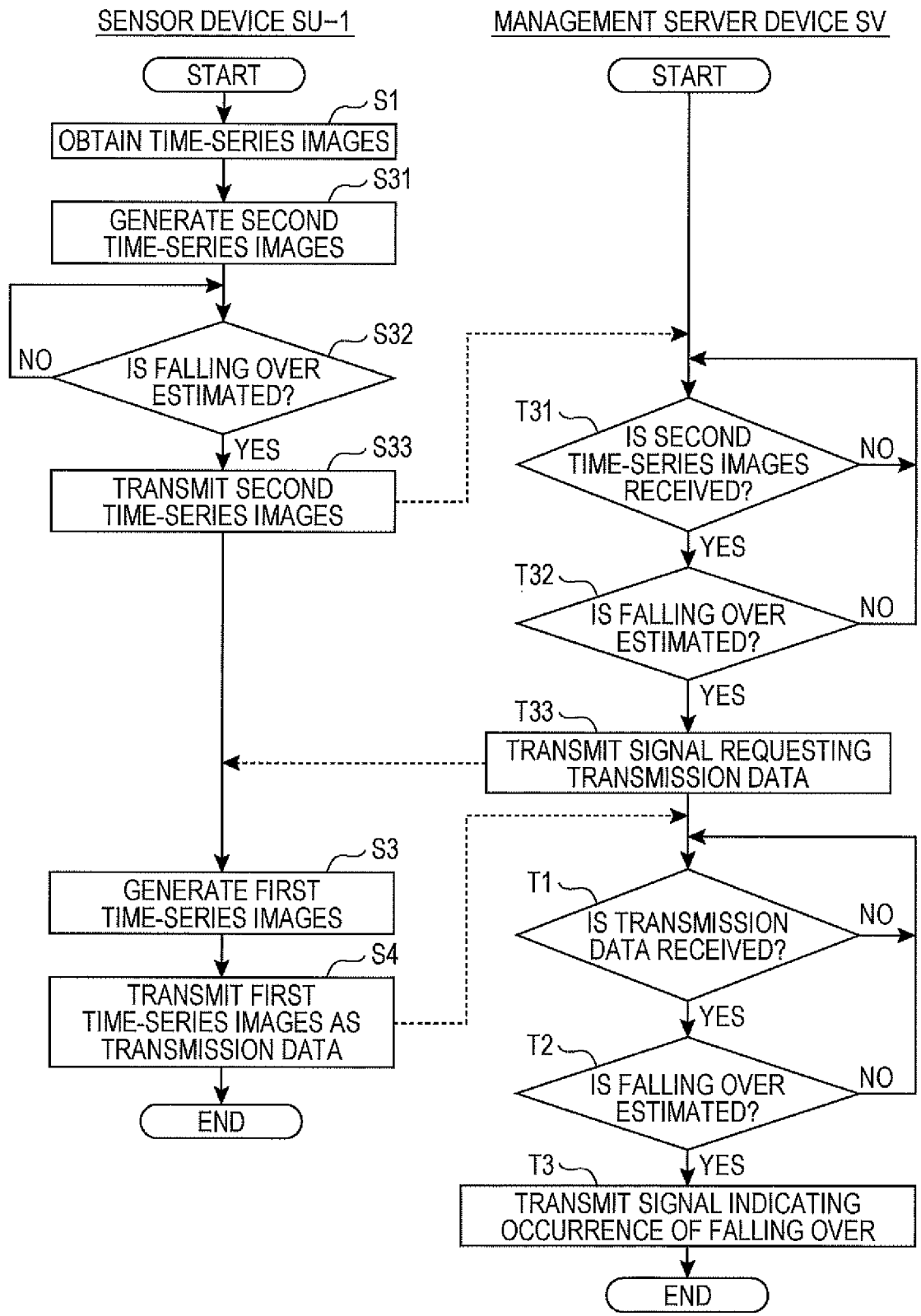
FIG. 15 is a flowchart illustrating operation of the third variation.

Operation in the third variation will be described. FIG. 15 is a flowchart illustrating the operation. Step S1 is the same as step S1 illustrated in FIG. 6.

With reference to FIGS. 13, 14, and 15, the second time-series images generation unit 17 generates the second time-series images Im-2 in which the resolution of the time-series images Im-0 obtained in step S1 is lowered (step S31). The storage processing unit 132 stores the second time-series images Im-2 obtained in step S31 in the ring buffer 131. Further, the storage processing unit 132 stores the time-series images Im-0 (in other words, time-series images Im-0 obtained in step S1) used for generating the second time-series images Im-2 in the ring buffer 131.

The first image recognition unit 14 performs the image recognition process on the second time-series images Im-2 generated in step S31, and estimates whether the monitored person Ob-1 has fallen over (step S32). This step is the same as step S2 illustrated in FIG. 6 except that the object of the image recognition process is the second time-series images Im-2, which is not the time-series images Im-0.

When the first image recognition unit 14 has made the estimation that the monitored person Ob-1 has fallen over (Yes in step S32), the transmission data generation unit 15 reads, from the ring buffer 131, the second time-series images Im-2 of a predetermined period (e.g., several seconds) including this time.

The SU communication IF unit 11 transmits the read second time-series images Im-2 via the network NW (step S33). The destination of this transmission is the management server device SV.

The SV control processing unit 20 determines whether the SV communication IF unit 21 has received the second time-series images Im-2 (step T31). When the SV control processing unit 20 determines that the SV communication IF unit 21 has not received the second time-series images Im-2 (No in step T31), the SV control processing unit 20 repeats the processing of step T31.

When the SV communication IF unit 21 has received the second time-series images Im-2 transmitted in step S33, the SV control processing unit 20 determines that the SV communication IF unit 21 has received the second time-series images Im-2 (Yes in step T31). Accordingly, the third image recognition unit 25 performs the image recognition process using the deep learning on the second time-series images Im-2 received by the SV communication IF unit 21 in real time, and estimates whether the monitored person Ob-1 has fallen over (step T32).

When the third image recognition unit 25 estimates that the monitored person Ob-1 has not fallen over (No in step T32), the SV control processing unit 20 repeats the processing of step T31.

When the third image recognition unit 25 estimates that the monitored person Ob-1 has fallen over (Yes in step T32), the SV control processing unit 20 causes the SV communication IF unit 21 to transmit a signal requesting transmission data with the sensor device SU-1 serving as a destination (step T33).

When the SU communication IF unit 11 has received the signal requesting the transmission data indicated in step T33, the transmission data generation unit 15 generates the first time-series images Im-1 as transmission data (step S3). This is the same as step S3 illustrated in FIG. 6. In step S31, the transmission data generation unit 15 generates the first time-series images Im-1 using the time-series images Im-0 used for generating the second time-series images Im-2. The SU communication IF unit 11 transmits, via the network NW, the first time-series images Im-1 generated in step S3 as transmission data (step S4). This is the same as step S4 illustrated in FIG. 6. Although the first time-series images Im-1 are exemplified as the transmission data, the feature map 103 may be used as the transmission data.

In this manner, on condition that the first image recognition unit 14 has made the estimation that the monitored person Ob-1 has fallen over (Yes in step S32), when the third image recognition unit 25 has further made the estimation that the monitored person Ob-1 has fallen over (Yes in step T32), the SU communication IF unit 11 transmits the transmission data (step S4).

Steps T1 to T3 are the same as steps T1 to T3 illustrated in FIG. 6.

Main effects of the third variation will be described. With reference to FIGS. 14 and 15, the third image recognition unit 25 performs the image recognition process on the second time-series images Im-2 that are time-series images in which the resolution is lowered (step T32), whereby the processing amount can be reduced compared with the second image recognition unit 22. Therefore, the load on the management server device SV is reduced in the case of the third image recognition unit 25 being used than in the case of the second image recognition unit 22 being used. When the third image recognition unit 25 has made the estimation that a predetermined event has occurred in the monitored person Ob (exemplary imaging target) (Yes in step T32), the second image recognition unit 22 estimates whether the predetermined event has occurred in the monitored person Ob (step T2). Therefore, according to the third variation, the processing amount of the image recognition process performed by the second image recognition unit 22 can be minimized, whereby the load on the management server device SV can be reduced.

Summary of Embodiments

An image recognition system according to a first aspect of an embodiment includes: a plurality of sensor devices; and a server device connected to each of the plurality of sensor devices via a network, in which each of the plurality of sensor devices includes: an acquisition unit that obtains time-series images captured in chronological order; a first image recognition unit that performs an image recognition process on the time-series images and estimates whether a predetermined event has occurred in an imaging target captured in the time-series images; a transmission data generation unit that generates, on condition that the first image recognition unit has made estimation that the predetermined event has occurred in the imaging target, first time-series images obtained by partial images including an image of the imaging target being cut out from respective images included in the time-series images or a feature map of each of the partial images included in the first time-series images as transmission data to be transmitted to the server device; and a first communication unit that transmits the transmission data via the network, and the server device includes: a second communication unit that receives the transmission data; and a second image recognition unit that performs an image recognition process with image recognition accuracy higher than image recognition accuracy of the first image recognition unit on the transmission data received by the second communication unit, and estimates whether the predetermined event has occurred in the imaging target.

On condition that the first image recognition unit included in the sensor device has made the estimation that a predetermined event has occurred in the imaging target, the second image recognition unit included in the server device performs the image recognition process with the image recognition accuracy higher than that of the first image recognition unit, and estimates whether the predetermined event has occurred in the imaging target. In this manner, the second image recognition unit executes the image recognition process with the image recognition accuracy higher than that of the first image recognition unit as needed without executing it constantly. Therefore, according to the image recognition system according to the first aspect of the embodiment, efficiency of the image recognition process executed by the second image recognition unit can be improved, whereby a load on the server device can be reduced.

In the case where the imaging target is a person who needs nursing or care, the occurrence of the predetermined event on the imaging target indicates, for example, falling, waking up, and getting up. In the case where the imaging target is a person in a shop, the occurrence of the predetermined event on the imaging target indicates, for example, shoplifting. The occurrence of the predetermined event is determined by, for example, a posture (e.g., posture of a person in a falling-over state, and posture of a person shoplifting).

For example, the first image recognition unit generates a silhouette image of the imaging target captured in the time-series images, and estimates whether a predetermined event has occurred in the imaging target using the silhouette image. The second image recognition unit performs, for example, an image recognition process using deep learning on the transmission data, thereby estimating whether the predetermined event has occurred in the imaging target.

In the configuration described above, the server device further includes: a determination unit that determines whether a predetermined condition indicating that a load on the server device is high is satisfied; and a request unit that requests the first time-series images as the transmission data to, from among the plurality of sensor devices, a sensor device that requests the server device to estimate whether the predetermined event has occurred in the imaging target when the predetermined condition is unsatisfied, and requests the feature map as the transmission data to the requesting sensor device when the predetermined condition is satisfied, the second image recognition unit generates the feature map of each of the partial images included in the first time-series images and estimates whether the predetermined event has occurred in the imaging target using the feature map when the transmission data received by the second communication unit is the first time-series images, and the second image recognition unit estimates whether the predetermined event has occurred in the imaging target using the feature map when the transmission data received by the second communication unit is the feature map.

The determination as to whether the load on the server device is high is made from the following points. The second image recognition unit performs a process of estimating whether the predetermined event has occurred in the imaging target using the feature map. Since the performance of the server device is higher than that of the sensor device, image processing capability of the server device is high. When the load on the server device is not high, the above-described processing performed by the second image recognition unit can speed up in the case where the server device generates the feature map rather than the case where the sensor device generates the feature map. On the other hand, when the load on the server device is high, the above-described processing performed by the second image recognition unit can speed up in the case where the sensor device generates the feature map rather than the case where the server device generates the feature map. Therefore, when the above-described processing performed by the second image recognition unit can speed up in the case where the server device generates the feature map rather than the case where the sensor device generates the feature map, the load on the server device is not high. When the above-described processing performed by the second image recognition unit can speed up in the case where the sensor device generates the feature map rather than the case where the server device generates the feature map, the load on the server device is high.

An example of the predetermined condition is a usage rate of the CPU included in the server device. The determination unit determines that the predetermined condition is satisfied when the usage rate of the CPU exceeds a predetermined threshold value (load on the server device is high), and determines that the predetermined condition is unsatisfied when the usage rate of the CPU is equal to or less than the predetermined threshold value (load on the server device is low).

The second image recognition unit estimates whether the predetermined event has occurred in the imaging target using the feature map. The feature map is generated using the first time-series images. Therefore, when the second image recognition unit starts the image recognition process from the feature map, the load on the server device can be reduced compared with a case where the image recognition process starts from the first time-series images. Accordingly, when the predetermined condition indicating that the load on the server device is high is satisfied (i.e., in a state where the load on the server device is high), the sensor device generates the feature map, thereby reducing the processing amount of the second image recognition unit. As a result, even when the load on the server device is high, the second image recognition unit can speed up the estimation as to whether the predetermined event has occurred in the imaging target.

The performance of the server device is higher than that of the sensor device. Accordingly, when the predetermined condition indicating that the load on the server device is high is unsatisfied (i.e., in a state where the load on the server device is low), the second image recognition unit also executes the generation process of the feature map. As a result, the second image recognition unit can speed up the estimation as to whether the predetermined event has occurred in the imaging target.

As described above, according to this configuration, the sensor device selects, as transmission data, the first time-series images or the feature map depending on the load on the server device. Accordingly, the second image recognition unit can speed up the estimation as to whether the predetermined event has occurred in the imaging target.

In the configuration described above, each of the plurality of sensor devices further includes a second time-series images generation unit that generates second time-series images in which resolution of the time-series images obtained by the acquisition unit is lowered, and the first image recognition unit performs the image recognition process on the second time-series images instead of the time-series images, and estimates whether the predetermined event has occurred in the imaging target captured in the second time-series images.

Since the resolution of the second time-series images is low, the processing amount for the image recognition can be reduced in the first image recognition unit. Therefore, according to this configuration, image recognition can be executed at high speed even if the information processing capability of the sensor device is low.

In the configuration described above, when the first image recognition unit has made the estimation that the predetermined event has occurred in the imaging target, the first communication unit transmits the second time-series images via the network, the second communication unit receives the second time-series images, the server device further includes a third image recognition unit that performs an image recognition process with image recognition accuracy higher than that of the first image recognition unit on the second time-series images received by the second communication unit, and estimates whether the predetermined event has occurred in the imaging target, and when the third image recognition unit has made the estimation that the predetermined event has occurred in the imaging target, the first communication unit transmits the transmission data.

According to this configuration, on condition that the first image recognition unit has made the estimation that the predetermined event has occurred in the imaging target, when the third image recognition unit has also made the estimation that the predetermined event has occurred in the imaging target, the first communication unit transmits the transmission data.

The third image recognition unit performs the image recognition process on the second time-series images that are time-series images in which the resolution is lowered, whereby the processing amount can be reduced compared with the second image recognition unit. Therefore, the load on the server device is reduced in the case of the third image recognition unit being used than in the case of the second image recognition unit being used. When the third image recognition unit has made the estimation that the predetermined event has occurred in the imaging target, the second image recognition unit estimates whether the predetermined event has occurred in the imaging target. Therefore, according to this configuration, the processing amount of the image recognition process performed by the second image recognition unit can be minimized, whereby the load on the server device can be reduced.

The third image recognition unit performs, for example, an image recognition process using deep learning on the second time-series images, thereby estimating whether the predetermined event has occurred in the imaging target.

In the configuration described above, the image recognition system further includes an alarm unit that issues an alarm when the second image recognition unit has made the estimation that the predetermined event has occurred in the imaging target.

According to this configuration, it becomes possible to make notification when the estimation that the predetermined event has occurred in the imaging target has been made.

An image recognition method according to a second aspect of an embodiment, which uses a plurality of sensor devices and a server device connected to each of the plurality of sensor devices via a network, includes: a first step of obtaining time-series images captured in chronological order, which is a step executed in each of the plurality of sensor devices; a second step of performing an image recognition process on the time-series images and estimating whether a predetermined event has occurred in an imaging target captured in the time-series images, which is a step executed in each of the plurality of sensor devices; a third step of generating, on condition that estimation that the predetermined event has occurred in the imaging target has been made in the second step, first time-series images obtained by partial images including an image of the imaging target being cut out from respective images included in the time-series images or a feature map of each of the partial images included in the first time-series images as transmission data to be transmitted to the server device, which is a step executed in each of the plurality of sensor devices; a fourth step of transmitting the transmission data via the network, which is a step executed in each of the plurality of sensor devices; a fifth step of receiving the transmission data, which is a step executed in the server device; and a sixth step of performing an image recognition process with image recognition accuracy higher than image recognition accuracy in the second step on the transmission data received in the fifth step and estimating whether the predetermined event has occurred in the imaging target, which is a step executed in the server device.

The image recognition method according to the second aspect of the embodiment defines the image recognition system according to the first aspect of the embodiment from the viewpoint of the method, and exerts the effect similar to that of the image recognition system according to the first aspect of the embodiment.

Although embodiments of the present invention have been illustrated and described in detail, they are illustrative only and do not limit the present invention. The scope of the present invention should be construed on the basis of the description of the appended claims.

INDUSTRIAL APPLICABILITY

According to the present invention, an image recognition system and an image recognition method can be provided.

The invention claimed is:
1. An image recognition system comprising:
a plurality of sensor devices each having a processing unit configured to: obtain time-series images chronologically captured;
perform a first image recognition process on a subset of the time-series images to first estimate whether a predetermined event has occurred by a target captured in the subset;
generate transmission data, when the first estimate indicates that the predetermined event has occurred, the transmission data including a feature map of a multilayered neural network of each of a plurality of image portions, which comprise the target clipped from respective images of the subset; and
transmit the transmission data via a network; and
a server device connected to each of the plurality of sensor devices via the network and configured to:
receive the transmission data; and
perform a second image recognition process on the received transmission data to second estimate whether the predetermined event has occurred by the target, wherein a first accuracy threshold for making the indication of the first estimate is set to a lower value than a second accuracy threshold for making an indication of the second estimate.

2. The image recognition system according to claim 1, wherein the server device further:
determines whether a predetermined condition, indicating that a load on the server device breaches a threshold, is satisfied;
requests the time-series images as the transmission data to, from among the plurality of sensor devices, a sensor device that requests the server device to estimate whether the predetermined event has occurred by the target when the predetermined condition is unsatisfied, and requests the feature map as the transmission data to the requesting sensor device when the predetermined condition is satisfied,
when the transmission data received is the time-series images, generates the feature map of each of the partial images included in the time-series images and estimates whether the predetermined event has occurred by the target using the feature map, and
when the transmission data received is the feature map, estimates whether the predetermined event has occurred by the target using the feature map.

3. The image recognition system according to claim 1, wherein:
each of the plurality of sensor devices further generates second time-series images in which resolution of the time-series images is lowered, performs the first image recognition process on the second time-series images instead of the time-series images, and estimates whether the predetermined event has occurred by the target captured in the second time-series images.

4. The image recognition system according to claim 3, wherein:
when each of the plurality of sensor devices has made the first estimation, each sensor device transmits the second time-series images via the network,
the server device receives the second time-series images, performs an image recognition process on the second time-series images received, and third estimates whether the predetermined event has occurred by the target, and
when the server device has made the third estimation that the predetermined event has occurred by the target, the respective sensor device transmits the transmission data.

5. The image recognition system according to claim 4, wherein the server device performs an image recognition process using deep learning on the second time-series images to estimate whether the predetermined event has occurred by the target.

6. The image recognition system according to claim 1, wherein the server device performs the image recognition process using deep learning on the transmission data to estimate whether the predetermined event has occurred by the target.

7. The image recognition system according to claim 1, wherein an alarm issues when the server device has made the second estimation that the predetermined event has occurred by the target.

8. An image recognition method that uses a plurality of sensor devices and a server device connected to each of the plurality of sensor devices via a network, the image recognition method comprising:
obtaining time-series images chronologically captured;
performing a first image recognition process on a subset of the time-series images to first estimate whether a predetermined event has occurred by a target captured in the subset;
generating transmission data, when the first estimate indicates that the predetermined event has occurred, the transmission data including a feature map of a multi-layered neural network of each of a plurality of image portions, which comprise the target clipped from respective images of the subset;
transmitting the transmission data via the network;
receiving the transmission data, which is executed in the server device; and
performing a second image recognition process on the received transmission data second estimating whether the predetermined event has occurred by the target, wherein a first accuracy threshold for making the indication of the first estimate is set to a lower value than a second accuracy threshold for making an indication of the second estimate.

9. The image recognition system according to claim 2, wherein each of the plurality of sensor devices further generates second time-series images in which resolution of the time-series images is lowered, performs the first image recognition process on the second time-series images instead of the time-series images, and estimates whether the predetermined event has occurred by the target captured in the second time-series images.

10. The image recognition system according to claim 2, wherein the server device performs the image recognition process using deep learning on the transmission data to estimate whether the predetermined event has occurred by the target.

11. The image recognition system according to claim 2, wherein an alarm issues when the server device has made the second estimation that the predetermined event has occurred by the target.

12. The image recognition system according to claim 3, wherein the server device performs the second image recognition process using deep learning on the transmission data to estimate whether the predetermined event has occurred by the target.

13. The image recognition system according to claim 3, wherein an alarm issues when the server device has made the second estimation that the predetermined event has occurred by the target.

14. The image recognition system according to claim 4, wherein the server device performs the second image recognition process using deep learning on the transmission data to estimate whether the predetermined event has occurred by the target.

15. The image recognition system according to claim 4, wherein an alarm issues when the server device has made the second estimation that the predetermined event has occurred by the target.

16. The image recognition system according to claim 5, wherein the server device performs the second image recognition process using deep learning on the transmission data to estimate whether the predetermined event has occurred by the target.

17. The image recognition system according to claim 5, wherein an alarm issues when the server device has made the second estimation that the predetermined event has occurred by the target.

18. The image recognition system according to claim 6, wherein an alarm issues when the server device has made the second estimation that the predetermined event has occurred by the target.

19. The image recognition system according to claim 1, wherein the target is a dynamic body.

20. The image recognition method according to claim 8, wherein the target is a dynamic body.

21. The image recognition system according to claim 1, wherein the second estimate indicates that the predetermined event has not occurred.

* * * * *